United States Patent [19]

Yuji et al.

[11] Patent Number: 5,243,581
[45] Date of Patent: Sep. 7, 1993

[54] DATA RECORDING/REPRODUCING APPARATUS HAVING PLURAL OPTICAL DISK DRIVES OPERATING IN PARALLEL

[75] Inventors: Takagi Yuji, Kadoma; Isao Satoh, Neyagawa; Yoshihisa Fukushima, Osaka; Yasushi Azumatani, Neyagawa; Hiroshi Hamasaka, Nishinomiya, all of Japan

[73] Assignee: Matsushita Electric Industrial Co., Ltd., Osaka, Japan

[21] Appl. No.: 556,330

[22] Filed: Jul. 23, 1990

[51] Int. Cl.$^5$ .............................................. G11B 17/22
[52] U.S. Cl. ...................................... 369/32; 369/54; 369/58
[58] Field of Search ................ 369/32, 33, 49, 54, 369/58, 59; 360/47, 98.01, 15, 53, 22

[56] References Cited

U.S. PATENT DOCUMENTS

| | | | |
|---|---|---|---|
| 4,562,577 | 12/1985 | Glover et al. | 371/38 |
| 4,870,643 | 9/1989 | Bultman et al. | 371/11.1 |
| 5,088,081 | 2/1992 | Farr | 369/54 |

Primary Examiner—Tommy Chin
Assistant Examiner—Robert Chevalier
Attorney, Agent, or Firm—Wenderoth, Lind & Ponack

[57] ABSTRACT

An optical disk recording and/or reproducing apparatus realizes a high ability to transmit data by operating a plurality of optical disk drives in parallel. By actuating the data recording or reproducing operation in parallel after these optical disk drives all have completed seeking the target track, deviation in synchronism between these drives can be suppressed below a one track maximum, resulting in the parallel operation of a plurality of optical disk drives using a a small capacity memory. In addition, by transmitting data via a high speed FIFO memory connected to each drive interface and a host interface to a RAM, speedy data transmission using the parallel operation of the plurality of drives is made possible. Further, a plurality of dual port control circuits each successively switches an access to each of a plurality of RAMs to a data transmission from or to a host computer and a data transmission from or to each drive, and the data transmission is executed between one of the RAMs and the host computer and at the same time, the data transmission is executed between each of the RAMs and each drive, thus being capable of transmitting data rapidly using the parallel operation of the plurality of drives.

4 Claims, 22 Drawing Sheets

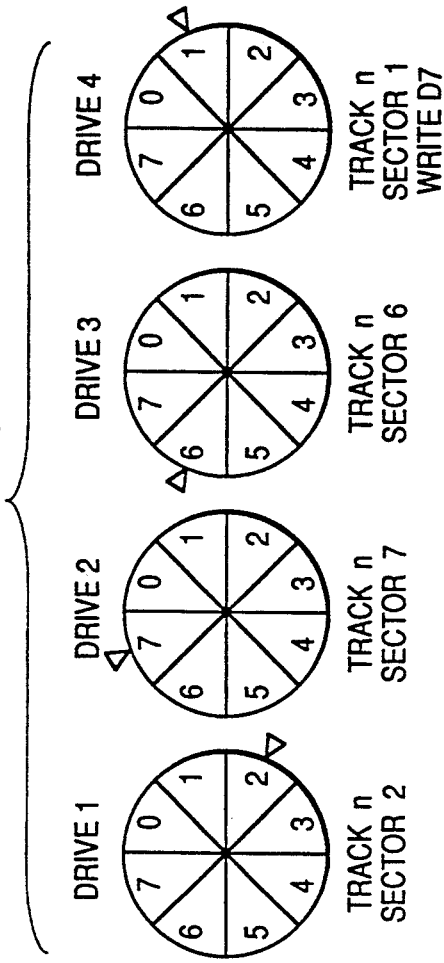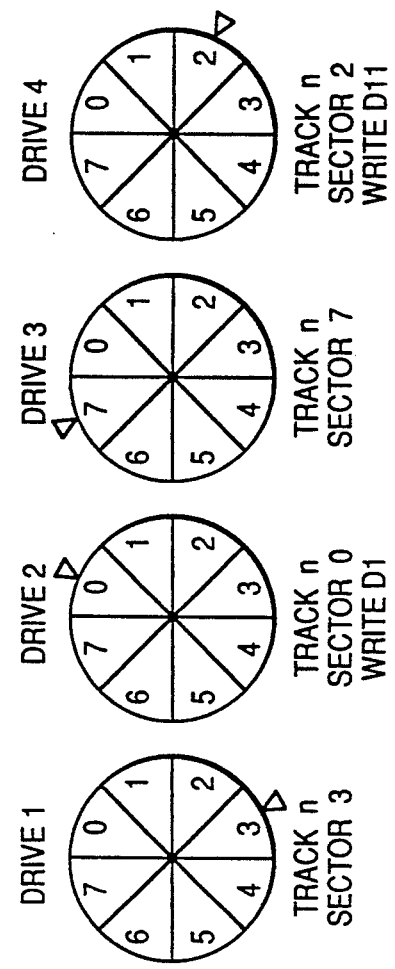

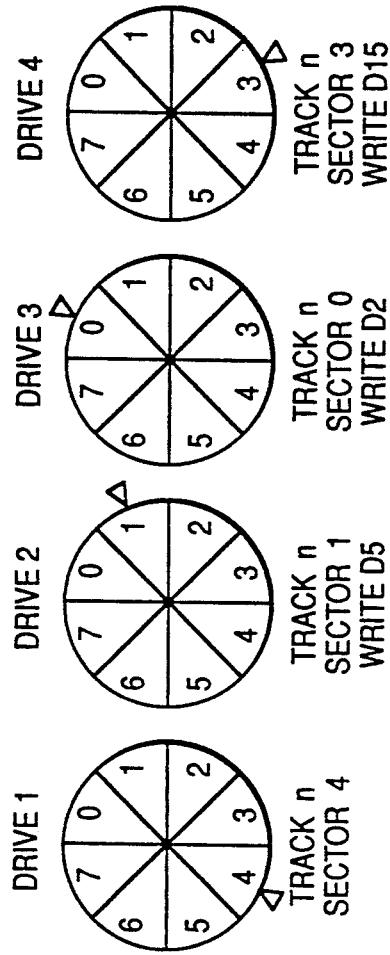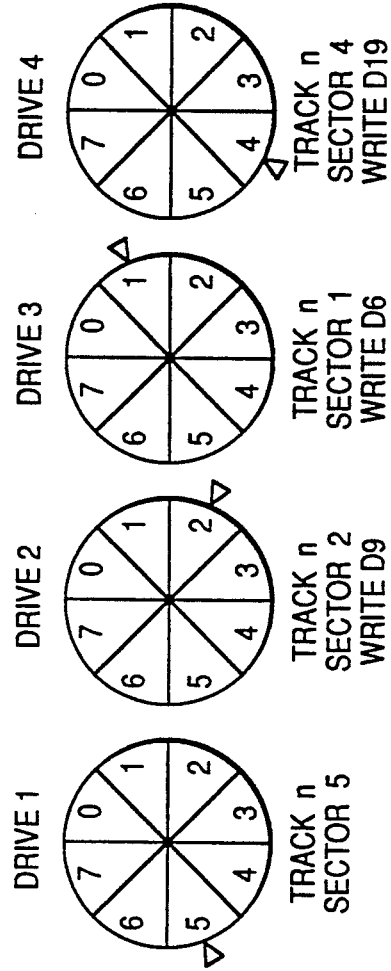

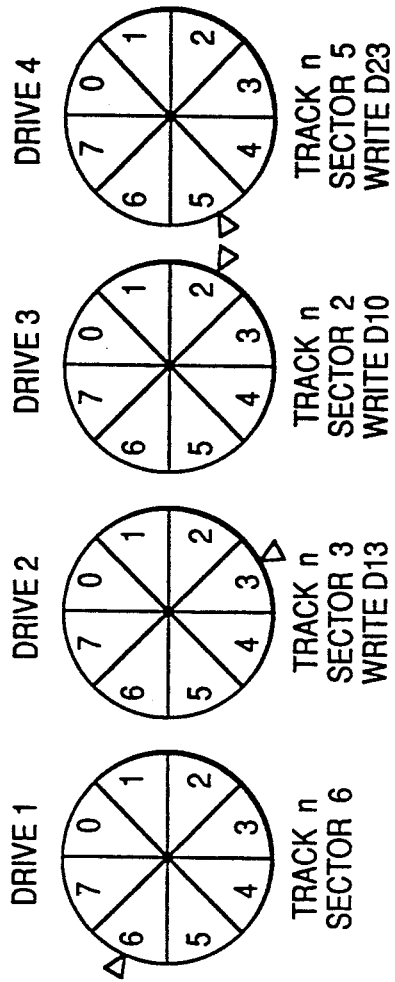
FIG. 10(a)
FIG. 10(b)
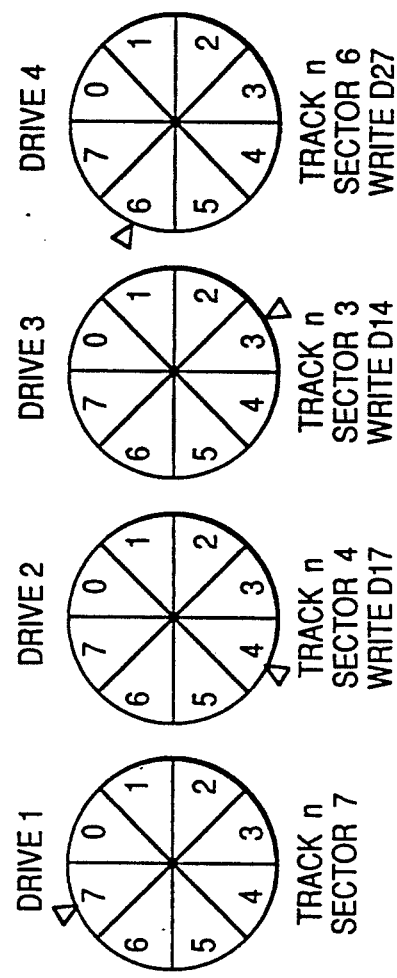
FIG. 11(a)
FIG. 11(b)

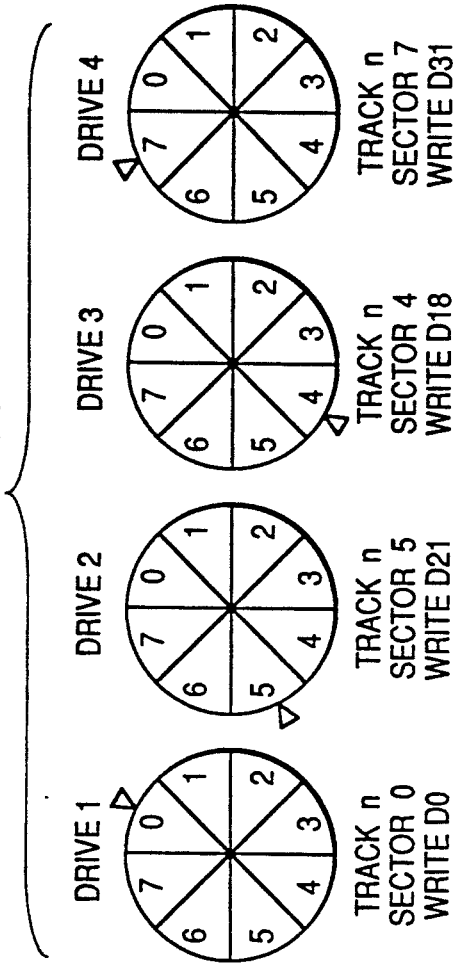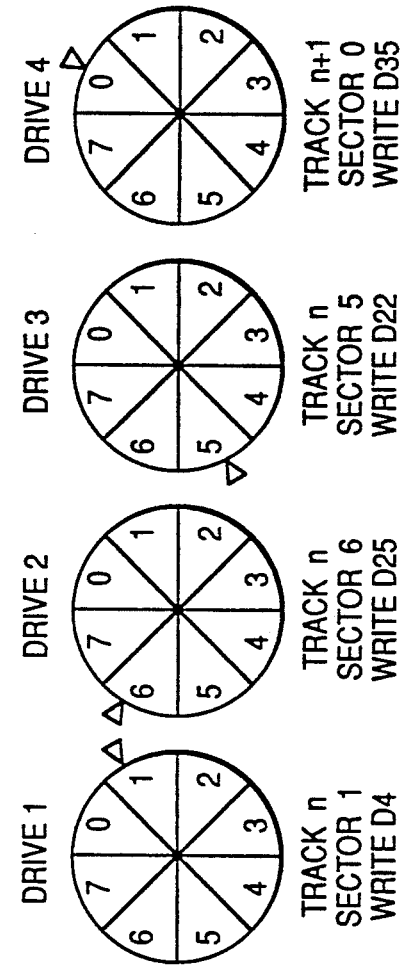

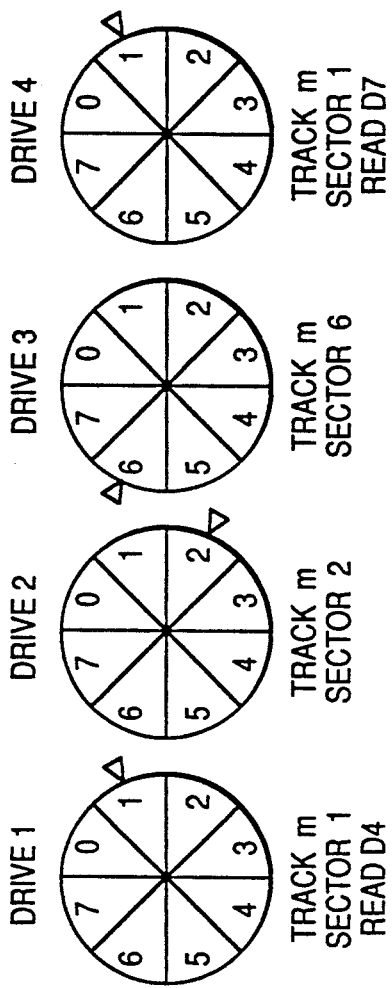
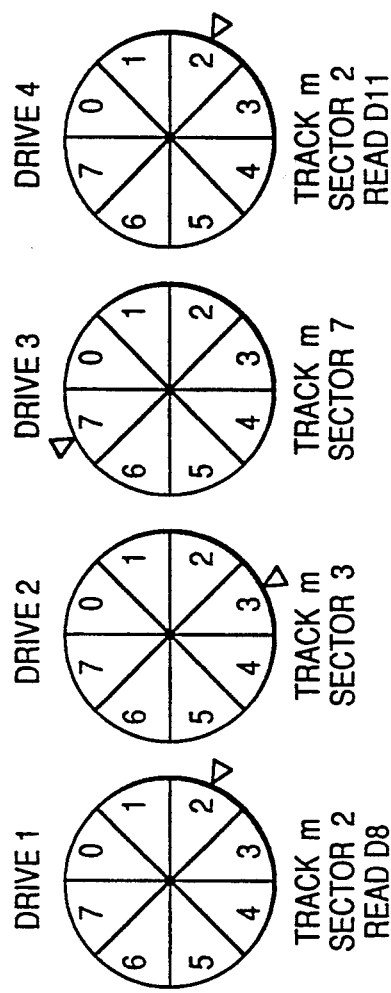
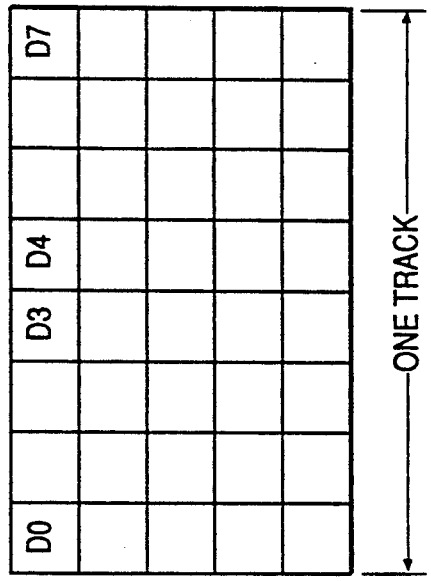
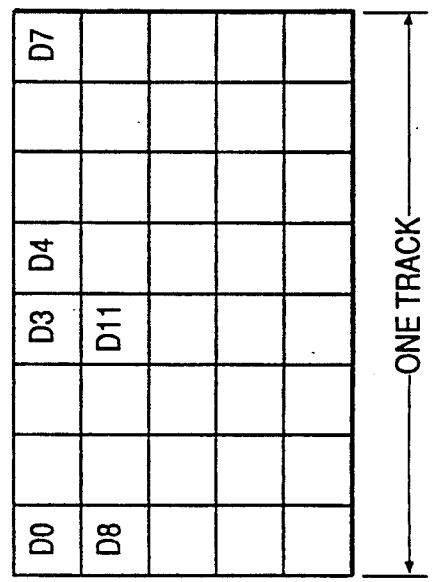

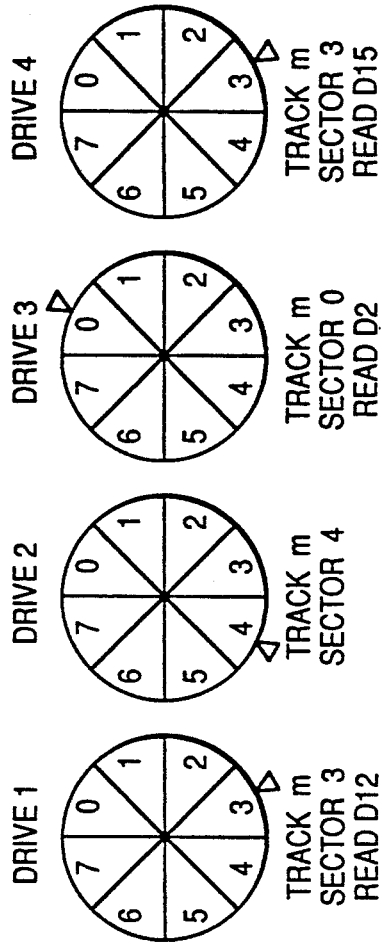
FIG. 19(a)
FIG. 19(b)
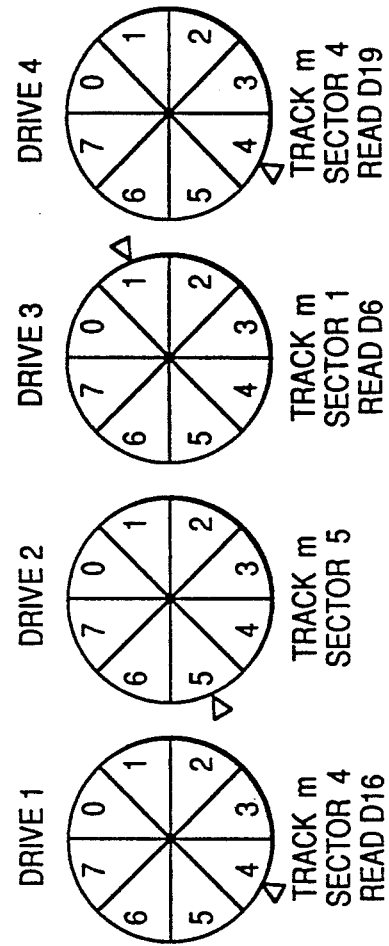
FIG. 20(a)
FIG. 20(b)

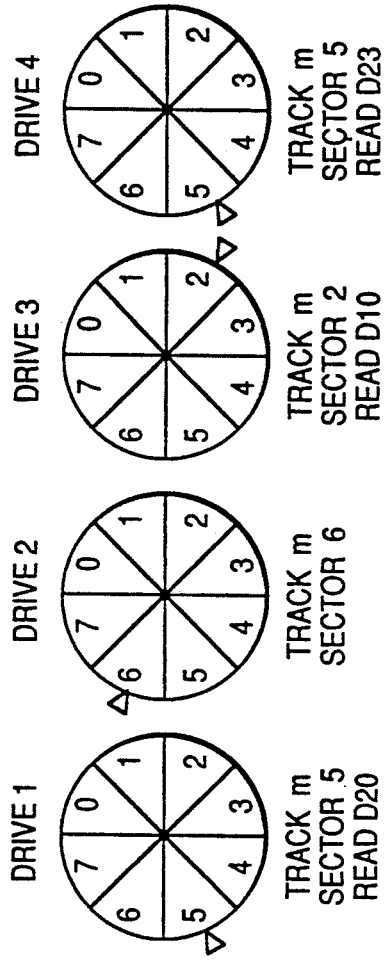
FIG. 21(a)
FIG. 21(b)
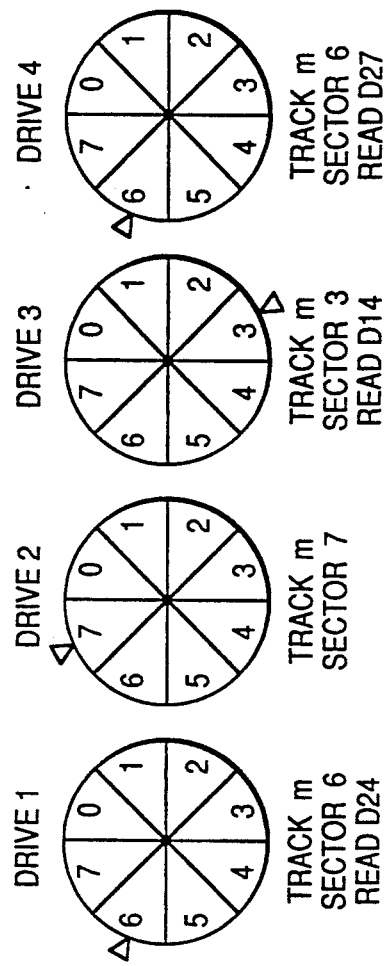
FIG. 22(a)
FIG. 22(b)

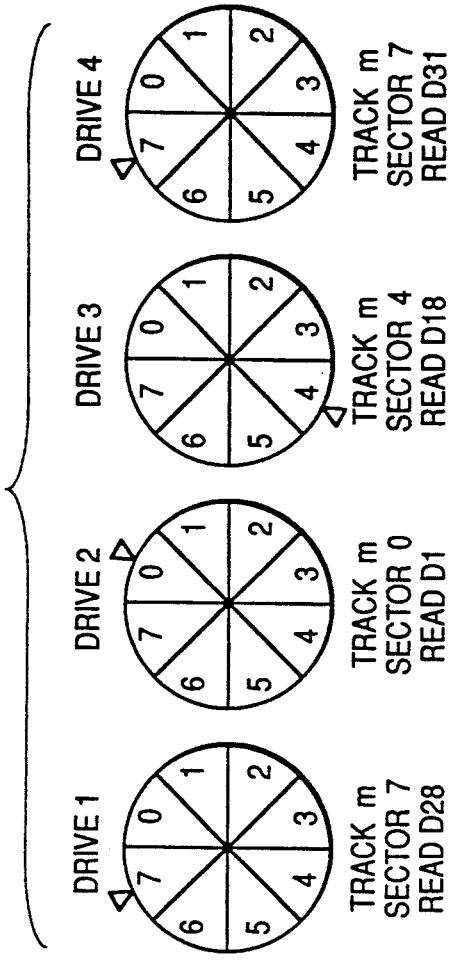
FIG. 23(a)
FIG. 23(b)
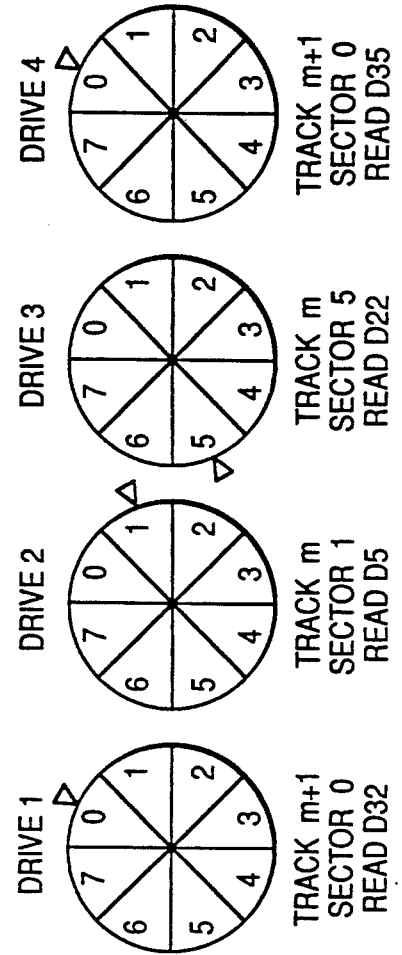
FIG. 24(a)
FIG. 24(b)

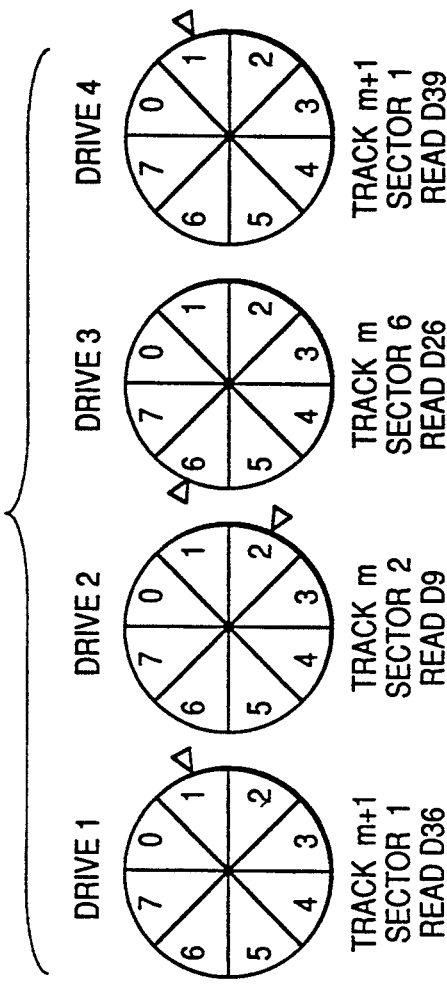
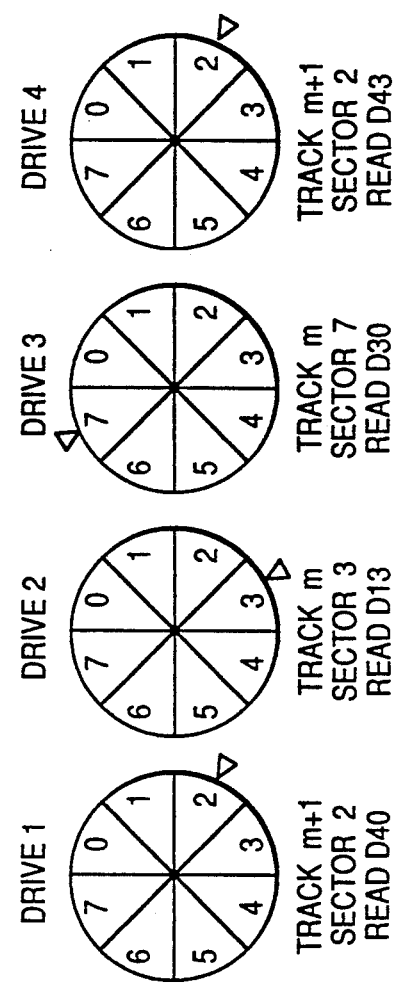

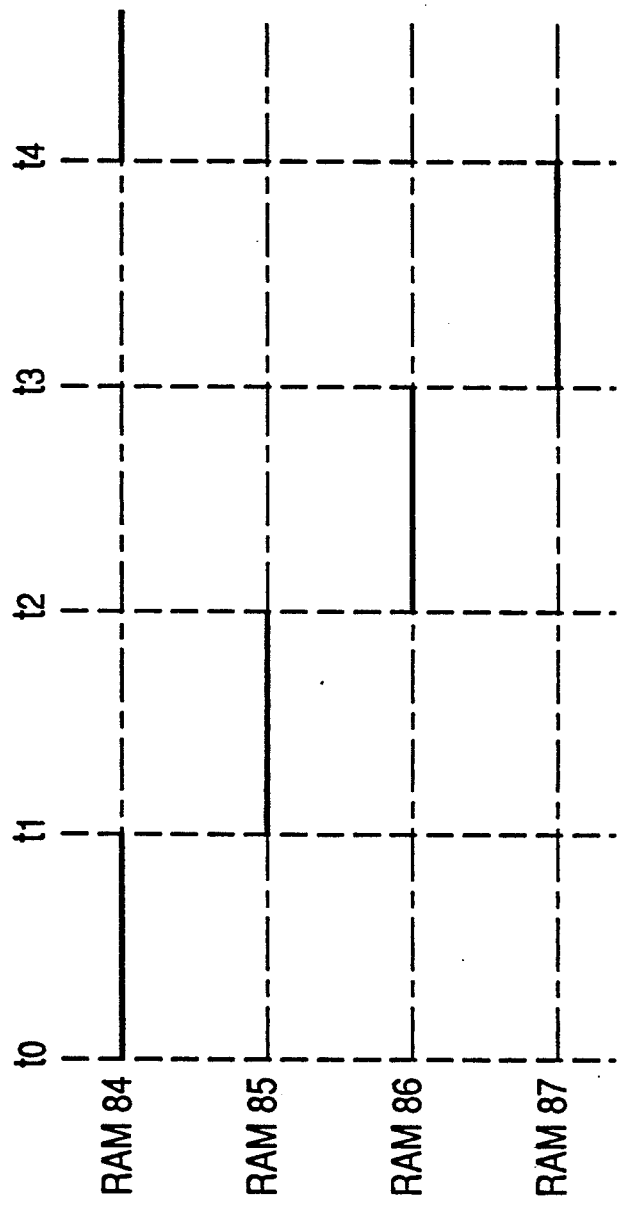

5,243,581

DATA RECORDING/REPRODUCING APPARATUS HAVING PLURAL OPTICAL DISK DRIVES OPERATING IN PARALLEL

BACKGROUND OF THE INVENTION

1. Field of the Invention

This invention relates to an information disk recording and/or reproducing apparatus used as an external storage device of a computer or the like, and more particularly to an optical disk recording and/or reproducing apparatus for recording or reproducing information on an optical disk by using a semiconductor laser.

2. Description of the Prior Art

Optical disk recording and/or reproducing apparatus in which light irradiated from a semiconductor laser is focused to a beam of about 1 m in diameter to record and/or reproduce a data on an optical disk at a high density has been watched with a keen interest recently. Conventional optical disk recording and/or reproducing apparatus is disclosed, for example, in U.S. Pat. No. 4,695,993.

FIG. 34 schematically shows a conventional optical disk recording and/or reproducing apparatus. Reference numeral 1 denotes an optical disk having tracks and divided into sectors for recording and/or reproducing information, 2 denotes an optical head comprising a semiconductor laser or the like, 3 denotes a disk motor for rotating the optical disk 1, 4 denotes data modulating and demodulating circuit for digitally modulating an error correction encoded data or for demodulating a reproducing data reproduced from the optical disk 1, 5 denotes a sector control circuit for controlling the timing to a sector to be recorded or reproduced, 6 denotes a control CPU comprising a microprocessor or the like for controlling the whole of the apparatus shown in FIG. 34, 7 denotes a laser drive head-amp circuit for driving the semiconductor laser and for amplifying a reproducing signal, 8 denotes a focus control circuit for focusing a laser beam on the recording plane of the optical disk 1, and 9 a tracking control circuit for tracking a laser beam to a track of the optical disk 1.

With the above-mentioned arrangement, the operation of a conventional optical disk recording and/or reproducing apparatus will be described below.

First, the case where data is to be recorded on the optical disk 1 will be explained. The control CPU 6 sends the address 10 of a target sector where recording is to take place to the sector control circuit 5. The sector control circuit 5 controls the tracking control circuit 9 to seek the target sector. The address 11 of a detected sector sent from the laser drive head-amp circuit 7 is compared with the address 10 of the target sector, and when detected and target sectors coincide with each other, the data modulating and demodulating circuit 4 is actuated to modulate the data. The laser drive head-amp circuit 7 drives the semiconductor laser of the optical head 2 in response to the modulated data 12 sent from the data modulating and demodulating circuit 4 to form recording pits on the recording plane of the optical disk 1, thus recording data thereon.

The case where data is to be reproduced, after seeking the target sector same manner as in the mentioned above, the sector control circuit 5 actuates the data modulating and demodulating circuit 4 to demodulate reproducing data to be sent to an error detection and correction circuit.

As explained above, a conventional optical disk recording and/or reproducing apparatus effects recording or reproducing of data by assigning the address of a target sector using the control CPU 6.

Recently, information processing systems such as, for example, the engineering work station (EWS) and personal computer have vastly progressed contributing largely rapid improvement in information processing capabilities. In addition, in order to extend such capabilities to the extent as possible, there is a growing tendency toward the provision of external storage devices connected with such information processing systems. The data transfer rate, on which the input output speed of data largely depends, constitutes one of the most important considerations associated with the external storage system.

High data transmissibility is required for an optical disk recording and/or reproducing apparatus having high density, large capacity and data reversibility.

In the optical disk recording and/or reproducing apparatus, however, the recording and/or reproducing of data on an optical disk is carried out using a laser beam irradiated from a semiconductor laser or the like. As the result, data transmissibility is limited depending on the output power limit of a semiconductor laser to be used or the recording sensitivity limit of a recording medium. For example, an optical disk recording and/or reproducing apparatus using an optical disk of 5.25 inches in diameter is said to have a rotational speed limited to about 3600 rpm at present. Also, regarding recording density, the status quo is less than otherwise achievable densities due to the wavelength limitation of the semiconductor laser to be used. Therefore, in the current optical disk recording and/or reproducing apparatus, it is to increase the data transmissibility to exceed present levels. As a result, a problem arises of insufficient data transmissibility when a high performance system is desired.

SUMMARY OF THE INVENTION

In order to solve the above-mentioned problems, an object of this invention is to provide an optical disk recording and/or reproducing apparatus capable of practically realizing a higher data transmission capability.

In order to attain the above-mentioned object, an optical disk recording and/or reproducing apparatus of this invention comprises: a plurality of optical disk drives each including seeking means for seeking a target track of an optical disk having a plurality of tracks each divided into a plurality of sectors, recording and/or reproducing means for recording data on and/or reproducing data from the optical disk on a sector by sector basis, encoding and decoding means for executing error detection and correction of data, data modulating and demodulating means, and means for recording and/or reproducing data by operating the plurality of optical disk drives in parallel.

As a preferable embodiment, an optical disk recording and/or reproducing apparatus of this invention comprises said plurality of optical disk drives, memory means for storing data sent from a host computer or data reproduced through said plurality of optical disk drives, and drive synchronizing means for actuating the data recording or reproducing operation through said plurality of optical disk drives after all these optical disk drives have completed seeking their target tracks whenever data is to be recorded or reproduced, thereby recording or reproducing data in parallel by synchronizing these optical disk drives with each other. With the arrangement as shown above, after the plurality of optical disk drives have been synchronized with each other on a track by track basis, the recording or reproducing operation is started, and the deviation in synchronism therewith is held to be less than a one track maximum. As a result, a relatively small memory capacity is necessary for the synchronization can be made small, so that the plurality of optical disk drives can be operated in parallel by additionally using a small amounts of hardware, thereby realizing to an increased data transmit capability.

As another preferable embodiment, an optical disk recording and/or reproducing apparatus of this invention comprises said plurality of optical disk drives and a drive control circuit for controlling said plurality of optical disk drives connected respectively with a plurality of drive interface means for transmitting data to be recorded or to be reproduced. The drive control circuit comprises a plurality of drive interface control means for transmitting via said plurality of drive interfaces data respectively from or to said plurality of optical disk drives, memory means for storing data to be recorded or to be reproduced, host interface control means for transmitting data via a host interface from or to the host computer, a plurality of FIFO memory means each being connected with each of said plurality of drive interface means and the host interface control means for temporarily storing data sent from each interface, and DMA control means for executing a DMA transmission of data between each of said plurality of FIFO memory means and said memory means. By successively switching the DMA channel correspondingly to each of these FIFO memory means, data can be recorded or reproduced in parallel through said plurality of optical disk drives.

With the above-mentioned arrangement, when the plurality of optical disk drives are operated in parallel, data transmission between the memory means and the host computer or between the memory means and each of the optical disk drives is executed via FIFO memory means generally having higher operational speeds in general, and the data stored in each FIFO memory means is switched to the DMA channel in a successive manner thereby increasing the data transmission speed between the memory means and the host computer. As a result, the data transmission between the host computer and each of the optical disk drives can be executed rapidly, thus realizing an increased data transmit capability.

As still another preferable embodiment, an optical disk recording and/or reproducing apparatus comprises said plurality of optical disk drives and a drive control circuit for controlling said plurality of optical disk drives connected respectively with a plurality of drive interfaces for transmitting data to be recorded or to be reproduced. The drive control circuit comprises a plurality of drive interface control means for transmitting data via these drive interfaces from or to said plurality of optical disk drives, respectively, a plurality of memory means for storing data sent via each of said plurality of drive interfaces, host interface control means for transmitting via a host interface data from or to the host computer, DMA control means for executing a DMA-transmission between each of said plurality of memory means and the host interface control means, and a plurality of dual port control means for switching an access to each of said plurality of memory means to either an access from the DMA control means or an access from each of said plurality of drive interface control means. The DMA transmission of a data is made between one of said plurality of memory means and the host interface control means and at the same time, the data transmission is made between each of the other memory means and each of said plurality of drive interface control means, thus being capable of recording or reproducing data in parallel through said plurality of optical disk drives. With the above-mentioned arrangement, when the plurality of optical disk drives are operated in parallel, even if the DMA transmission is under way through the plurality of dual port control means between the host interface control means and one of the memory means, data transmission is still passable between the other memory means and each optical disk drive. As such, data transmission between the host computer and each of the plurality of optical disk drives can be effected rapidly, thus realizing an increased data transmit capability.

BRIEF DESCRIPTION OF THE DRAWINGS

FIGS. 4(a) to 13(b) show memory maps for explaining the contents of the buffer memory 15 during the recording operation of the apparatus shown in FIG. 1, respectively;

FIG. 15(a) to 26(b) show memory maps for explaining the contents of the buffer memory 15 during the reproducing operation of the apparatus shown in FIG. 1;

FIG. 32 is a time chart for explaining the switching of an access to each of the RAMs 84, 85, 86 and 87 shown in FIG. 31;

DESCRIPTION OF THE PREFERRED EMBODIMENTS

Figure 1:
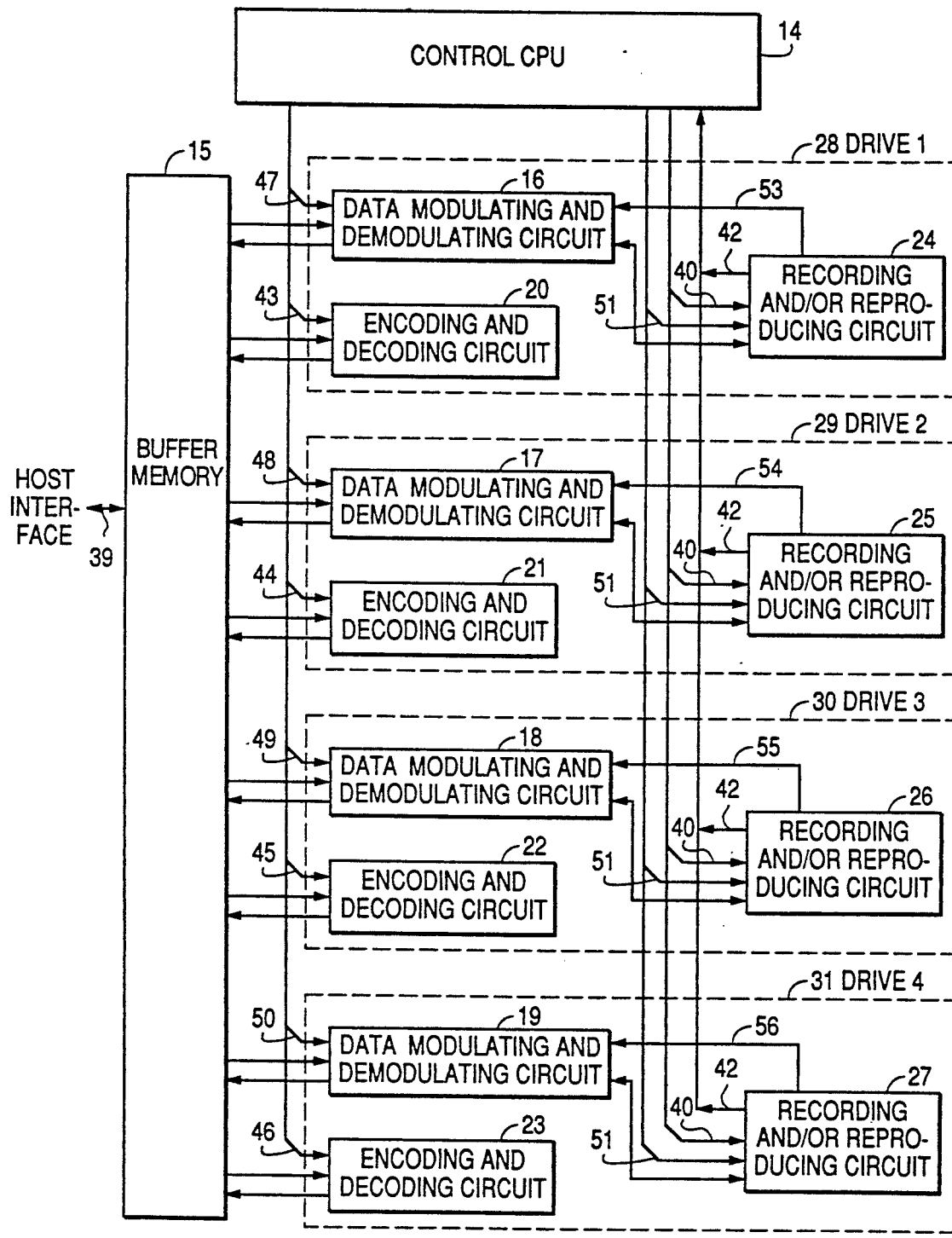
FIG. 1 is a schematic drawing of an optical disk recording and/or reproducing apparatus of a first embodiment of this invention.

An optical disk recording and/or reproducing apparatus of this invention will be described below while referring to the drawings.

FIG. 1 schematically shows an optical disk recording and/or reproducing apparatus according to a first embodiment of this invention.

In FIG. 1, the reference numeral 14 denotes a control CPU made of a microprocessor or the like for controlling the the entire optical disk recording and/or reproducing apparatus, 15 denotes a buffer memory such as a semiconductor memory for temporarily storing data to be recorded or to be reproduced, 16, 17, 18 and 19 each denote a data modulating and demodulating circuit for digitally modulating an error detection and correction encoded data and for demodulating a reproducing data, 20, 21, 22 and 23 each denote an encoding and decoding circuit for encoding data for the purpose of error detection and correction or for executing the error detection and correction of demodulated data, and 24, 25, 26 and 27 each denote a recording and/or reproducing circuit for recording or reproducing data.

With the optical disk recording and/or reproducing apparatus of the first embodiment of this invention arranged as shown above, four optical drives 1, 2, 3 and 4 are respectively provided in corresponding to optical disk drive circuits 28, 29, 30 and 31 denoted by the broken lines in FIG. 1.

Figure 2:
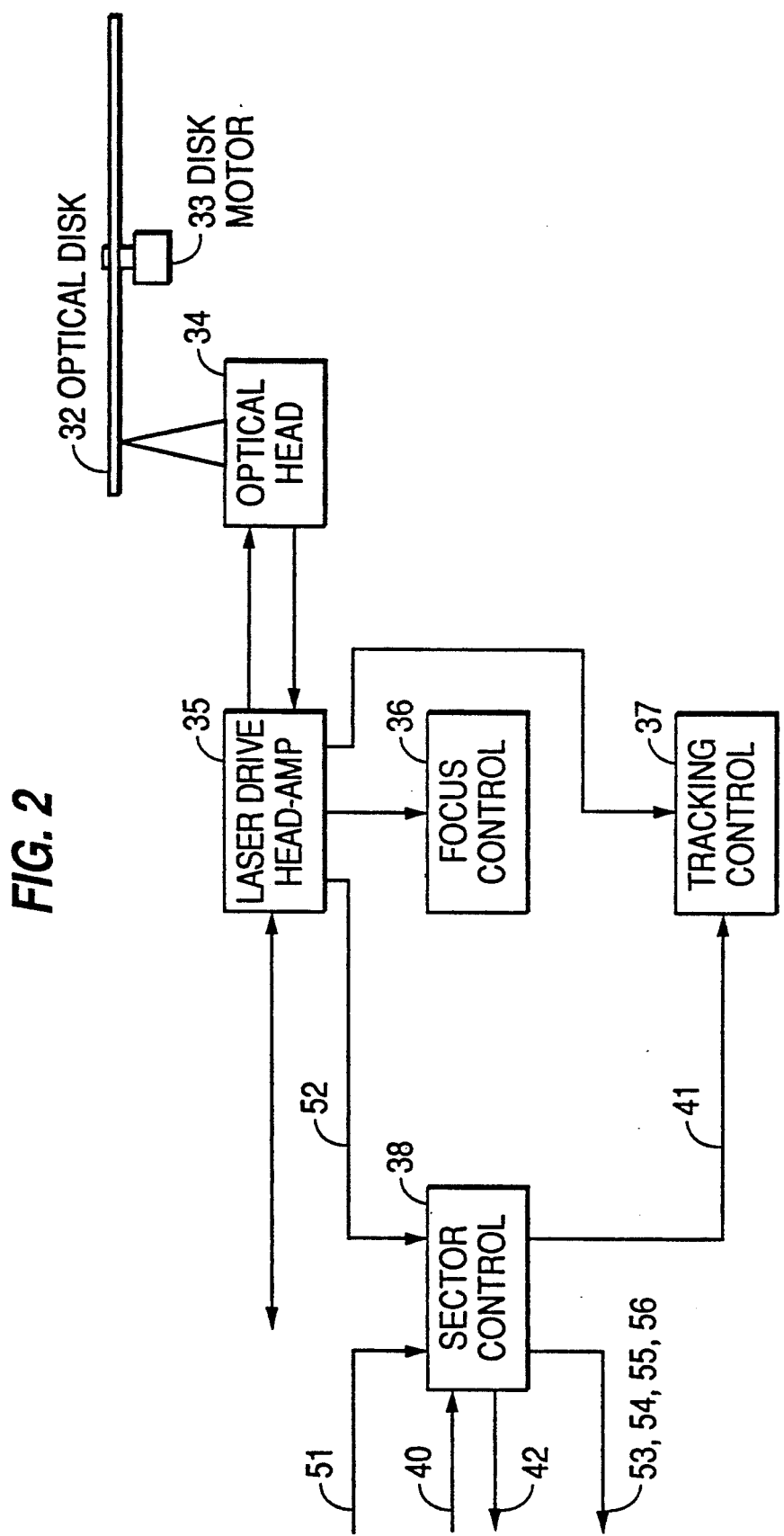
FIG. 2 is a block diagram showing in detail each of recording and/or reproducing circuits 24, 25, 26 and 27 of the apparatus shown in FIG. 1.

FIG. 2 is a block diagram showing in detail each of the recording and/or reproducing circuits 24, 25, 26 and 27 shown in FIG. 1.

The reference numeral 32 denotes an optical disk having plural tracks divided into sectors for recording or reproducing data thereon on a sector-by-sector basis, 33 denotes a disk motor for rotating the optical disk 32, 34 denotes an optical head comprising a semiconductor laser or the like, 35 denotes a laser drive head-amp circuit for driving the semiconductor laser and for amplifying a reproducing signal, 36 denotes a focus control circuit for focusing a laser beam onto the recording plane of the optical disk 32, 37 denotes a tracking control circuit for tracking a laser beam to a track of the optical disk 32, and 38 denotes a sector control circuit for controlling the timing to a sector to be recorded or to be reproduced.

With the optical disk recording and/or reproducing apparatus of this embodiment as shown above, the operation will be explained below.

First, the recording operation of data on the optical disk 32 will be shown. User data 39 is stored via a host interface into the buffer memory 15. The control CPU 14 sends the track address 40 of a sector to be recorded to the sector control circuit 38 of each of drives 1 to 4. The sector control circuit 38 of each drive sends the address 41 of a target track to the tracking control circuit 37 for commanding a seeking operation of the target track. The tracking control circuit 37 drives a linear motor or the like to thereby to seek the target track. Here, the sector control circuit 38 compares the address of the target track with the address of a track read through the laser drive head-amp circuit 35, and when the two track addresses coincide with each other, the sector control unit 38 sends a seek completion signal 42 to the control CPU 14.

The control CPU 14 also sends addresses 43, 44, 45 and 46 of the buffer memory 15 to encoding and decoding circuits 20, 21, 22 and 23 of drives 1, 2, 3 and 4, respectively, and allocates the user data 39 to the encoding and decoding circuits 20, 21, 22 and 23 of respective drives 1, 2, 3 and 4 in the sector unit. The encoding and decoding circuits 20, 21, 22 and 23 respectively encode the user data 39 for the purpose of the error detection and correction.

When the seek completion signal 42 is sent from all the drives 1 to 4, the control CPU 14 commands each drive to record the user data 39. The control CPU 14 sends the addresses 47, 48, 45 and 50 of encoded data on the buffer memory 15 respectively to the data modulating and demodulating circuits 16, 17, 18 and 19 for allocating in the sector unit. In addition, the control CPU 14 sends the address 51 of a sector to be recorded to the sector control circuit 38 of each drive. The sector control circuit 38 compares the address 15 of the target sector with the address 52 of a sector read through the laser drive head-amp circuit 35 and when the address 15 and address 52 coincide with each other, sends actuating signals 53, 54, 55 and 56 respectively to the data modulating and demodulating circuits 16, 17, 18 and 19. The data modulating and demodulating circuits 16, 17, 18 and 19 respectively modulate the data 39 and the semiconductor laser is driven in response to the data thus modulated to thereby record data on the optical disk 32.

In the case where the control CPU 14 allocates addresses of the buffer memory 15 to the encoding and decoding circuits 20, 21, 22 and 23 and data modulating and demodulating circuits 16, 17, 18 and 19 of the optical disk drives 28, 29, 30 and 31 in the sector unit, respectively, the control CPU 14 sets the addresses 43, 44, 45 and 46 and addresses 47, 48, 49 and 50 respectively to the encoding and decoding circuits 20, 21, 22 and 23 and the data modulating and demodulating circuits 16, 17, 18 and 19 such that their addresses on the buffer memory 15 can be deviated by the capacity of one sector from each other and then, actuates the circuits 20, 21, 22 and 23 and the circuits 16, 17, 18 and 19. The circuits 20, 21, 22 and 23 and the circuit 16, 17, 18 and 19 respectively execute incrementation of addresses in a successive manner using the addresses 43, 44, 45 and 46 and 47, 48, 49 and 50 thus set as an initial value, thus being capable of effecting access of the buffer memory 15 to different addresses in the sector unit.

Figure 3:
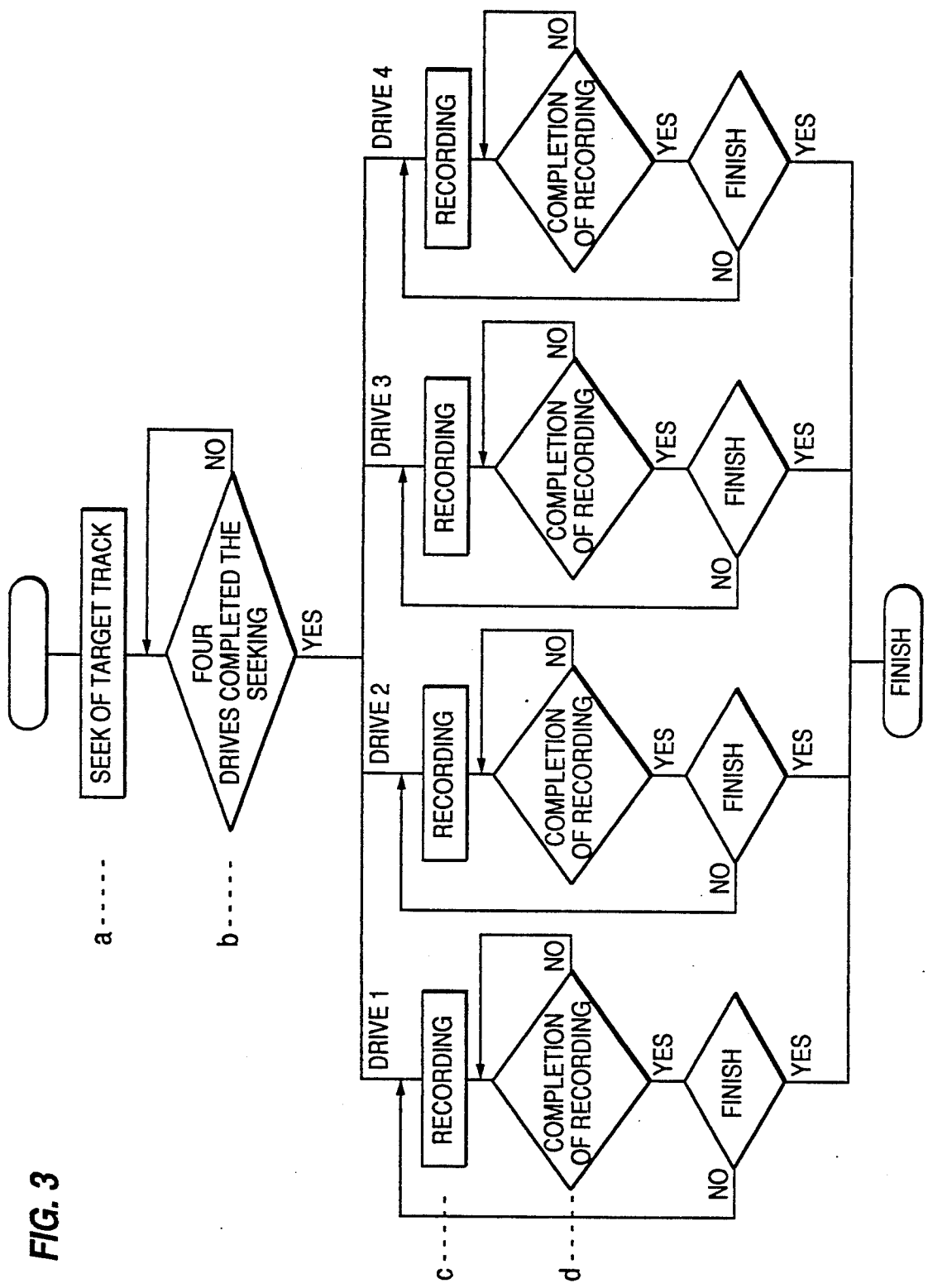
FIG. 3 is a flow chart for explaining the synchronizing process of each drive by the control CPU 14 during recording of the apparatus shown in FIG. 1.

FIG. 3 is a flow chart for explaining the synchronizing process for each drive by the control CPU 14 in the recording operation. At step a, the control CPU 14 commands each drive to seek a target track. At step b, the control CPU 14 waits until the seek completion signal 42 is sent from the sector control circuit 38 of each drive. At step c, after the seek completion signal 42 is sent from the circuit 38 of each drive, the control CPU 14 sends the address 51 of the sector to be recorded to each drive thereby commanding the same to record the user data 39. At step d, the control CPU 14 commands each drive to record the data in a successive manner until the recording of data in the sector is completed.

Memory maps for explaining the contents of the buffer memory 15 in continuously recording data while executing the synchronizing process of each drive by the control CPU 14 are shown in FIGS. 4(a) through 13(b).

Figure 4B:
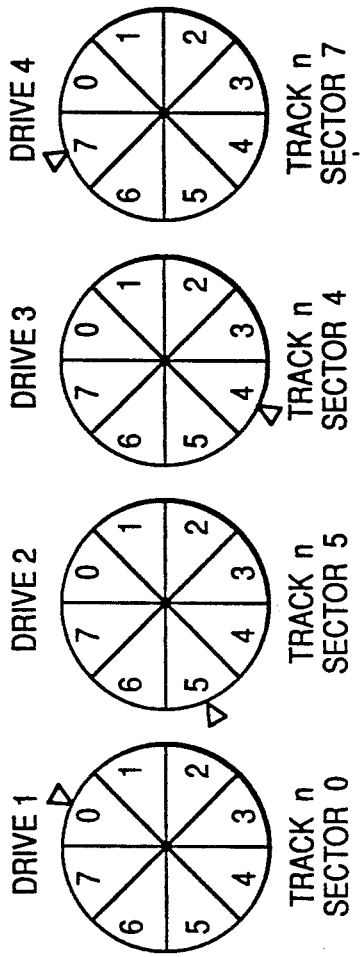
Figure 5B:
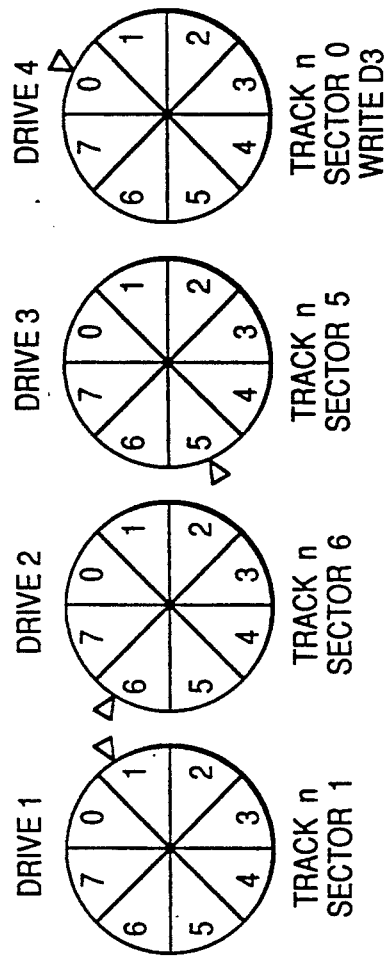
Figure 4A:
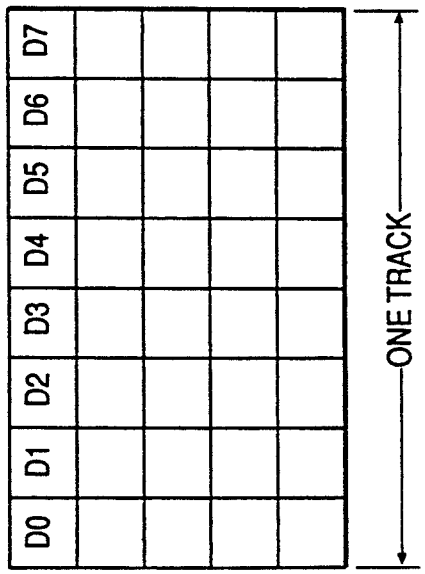

In FIGS. 4(a) and (b), a case where one track has eight sectors, four drives are connected and the buffer memory 15 comprises a memory with a storage capacity responsible for 40 sectors is exemplified. FIG. 4; (a) depicts the contents of the buffer memory and (b) the position of the optical head of each drive at a given point in time.

At time $t_0$, the seek completion signal 42 has been sent from each of the drives 1, 2, 3 and 4.

At time $t_0$ as shown in FIG. 4(b), optical heads of the drives, 1, 2, 3 and 4 are respectively positioned at sectors 0, 5, 4 and 7 of a track n to thereby to record the data.

Also, as shown in FIG. 4(a), an error correction encoding process is carried out for the data from D0 to D3 on the buffer memory 15 and the data from D4 to D7 are sent from the host interface.

At time $t_1$ as shown in FIG. 4(b), optical heads of the drives 1, 2, 3 and 4 are respectively be positioned at sectors 1, 6, 5 and 0 of a track n, and at a sector 0 of the drive 4 is written an encoded data D3.

Figure 5A:
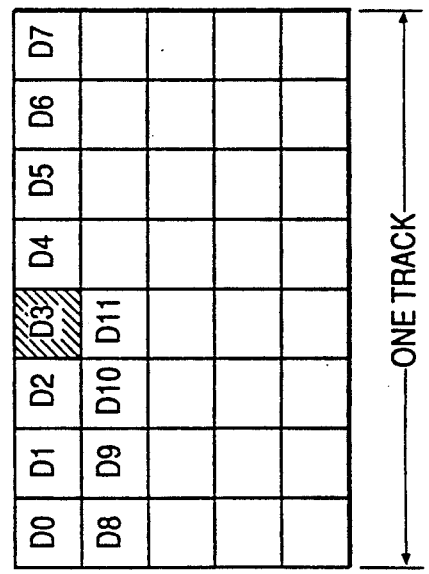

Data D8 to D11, as shown in FIG. 5(a), are sent from the host interface and the error correction encoding process is carried out for the data D4 to D7. Also, the data D3 shaded in FIG. 5(a) is written through the drive 4.

At time $t_2$, as shown in FIG. 6(b), optical heads of the drives 1, 2, 3 and 4 are respectively positioned at sectors 2, 7, 6 and 1 of the track n, and encoded data D7 is written in the sector 1 of the drive 4.

Data D12 to D15, as shown in FIG. 6(a), are sent from the host interface and data D8 to D11 are subjected to the error correction encoding process. Also, data D7 shaded in FIG. 6(a) is written by the drive 4.

At time $t_3$ as shown in FIG. 7(b), optical heads of the drives 1, 2, 3 and 4 are positioned at sectors 3, 0, 7 and 2 of the track n, and encoded data D1 and D11 are written in sectors 0 and 2 of respective drives 2 and 4, respectively.

Data D16 to D19, as shown in FIG. 7(a) are sent from the host interface and data D12 t D15 are subjected to the error correction encoding process. Also, data D1 and D11 are written by the drives 2 and 4, respectively.

At times $t_4$ to $t_7$ (FIGS. 8(a) and (b) to FIGS. 11(a) and at time $t_8$, as shown in FIG. 12(b), the same processes as those shown above are executed.

At time $t_{/8}$, as shown in FIG. 12(b), optical heads of the drives 1, 2, 3 and 4 are positioned at sectors 0, 5, 4 and 7 of the track n, and encoded data D0, D21, D18 and D31 are written in the sectors 0, 5, 4 and 7 of the drives 1, 2, 3 and 4, respectively.

Data D36 to D39, as shown in FIG. 12(a), are sent from the host interface and data D32 to D35 are subjected to the error correction encoding process. Also, data D0, D21, D18 and D31 shaded in FIG. 12(a) are written by the drives 1, 2, 3 and 4, respectively.

At time $t_9$, as shown in FIG. 13(b), optical heads of the drives 1, 2, 3 and 4 are respectively positioned at sectors 1, 6 and 5 of the track n and the sector 0 of a truck (n+1), and encoded data D4, D25, D22 and D35 are written in the sectors 1, 6 and 5 of the track n and the sector 0 of the track (n+1), respectively.

As the data D0 to D4, as shown in FIG. 13(a), are already written by respective drives 1, 2, 3 and 4, data D40 to D43 sent from the host interface are written in these areas. Data D36 to D39 are subjected to the error correction encoding process. Also, data D4, D25, D23, and D35 shaded in FIG. 13(a) are written by the drives 1, 2, 3 and 4, respectively.

As shown above, by using a buffer memory with a storage capacity responsible for at least 40 sectors, data can be continuously recorded at a transmission speed which is four times as high as that obtained when one such drive unit is used.

Next, the reproducing process of data from the optical disk 32 will be explained below.

In FIGS. 1 and 2, the control CPU 14 sends the track address 40 of a sector to be read to the sector control circuit 38 of each of the drives 1, 2, 3 and 4. The sector control circuit 38 of each drive sends the address 41 of a target track to the tracking control circuit 37 of each drive to command the same to seek the target track. Here, the sector control circuit 38 compares the address 41 of the target track with the address of a track read from the laser drive head-amp circuit 35 and when the two addresses coincide with each other, sends the seek completion signal 42 to the control CPU 14.

When the seek completion signal 42 is sent from each drive, the control CPU 14 commands each drive to reproduce the data. The control CPU 14 sends addresses 47, 48, 49 and 50 showing positions to be stored in the buffer memory 15 of the demodulated data to the data modulating and demodulating circuits 16, 17, 18 and 19 for allocating them in the sector unit, respectively. Also, the control CPU 14 sends the address 15 of a sector to be read to the sector control circuit 38 of each drive. The sector control circuit 38 of each drive compares the address 51 of the target sector with the address 52 of a sector read through the laser drive head-amp circuit 35 and when the addresses 51 and 52 coincide with each other, sends actuating signals 53, 54, 55 and 56 respectively to the data modulating and demodulating circuits 16, 17, 18 and 19. The data modulating and demodulating circuits 16, 17, 18 and 19 each demodulates a reproducing data sent from the laser drive head-amp circuit 35 to store the data thus demodulated into the buffer memory 15. Also, the control CPU 14 sends addresses 43, 44, 45 and 46 on the buffer memory 15 respectively to the encoding and decoding circuits 20, 21, 22 and 23 to thereby decode the data. Data obtained through the error correction process by the encoding and decoding circuits 20, 21, 22 and 23 are sent through the host interface to the host computer.

Figure 14:
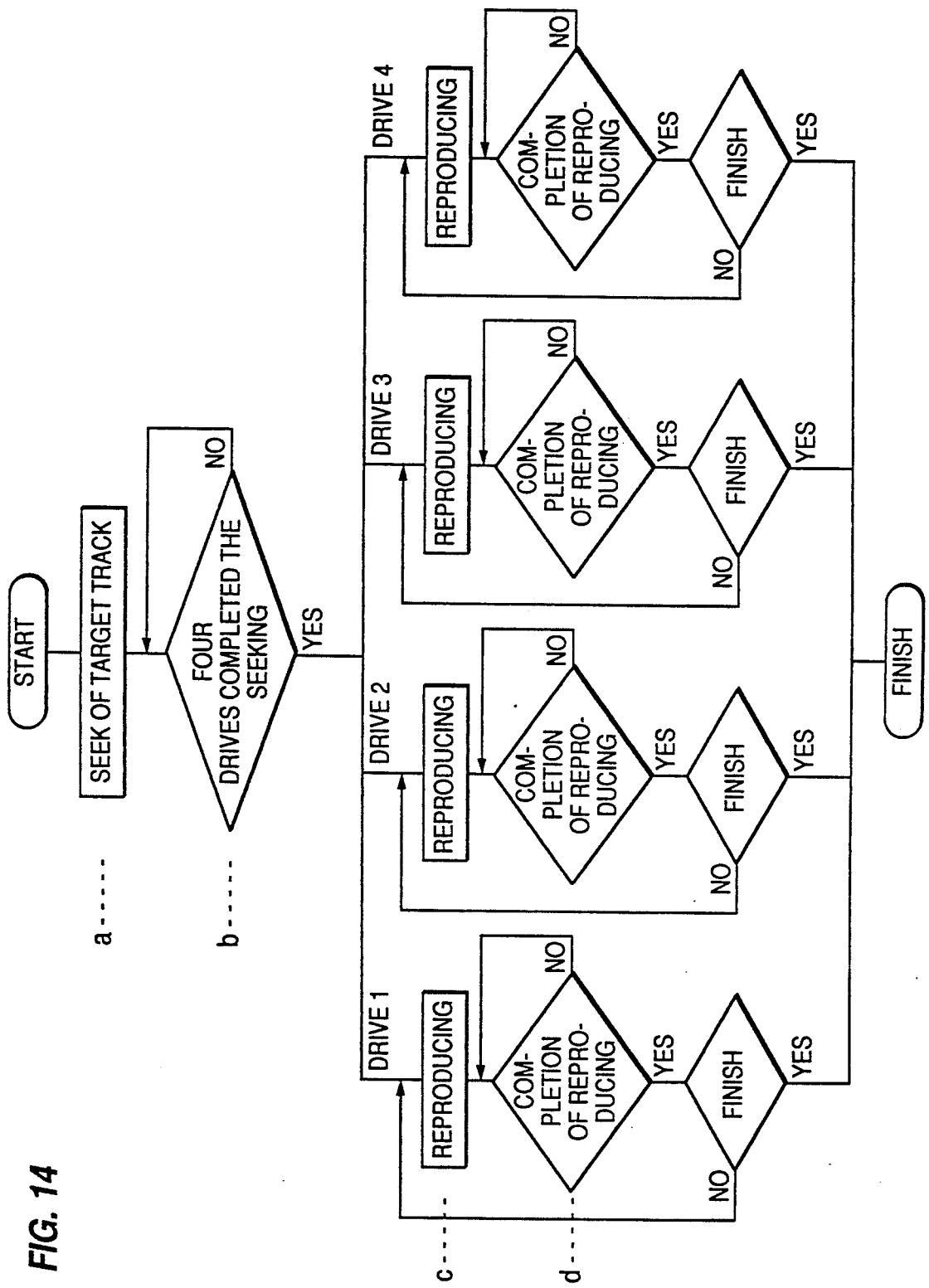
FIG. 14 is flow chart for explaining the synchronizing process of each drive by the control CPU 14 during the reproducing operation of the apparatus shown in FIG. 1.

FIG. 14 is a flow chart for explaining the synchronizing process for each drive by the control CPU 14 in the reproducing operation shown above. At step a the control CPU 14 commands each drive to seek a target track. At step b, the control CPU 14 waits until the seek completion signal 42 is sent from the sector control circuit 38 of each drive. At step c, after the seek completion signal 42 is sent from the sector control circuit 38 of each drive, the control CPU 14 sends the address 51 of the sector to be read to each drive thereby commanding the same to reproduce the data. At step d, that the control CPU 14 commands each drive to reproduce the data in a successive manner until the reproducing of data in the sector is completed.

Figure 15B:
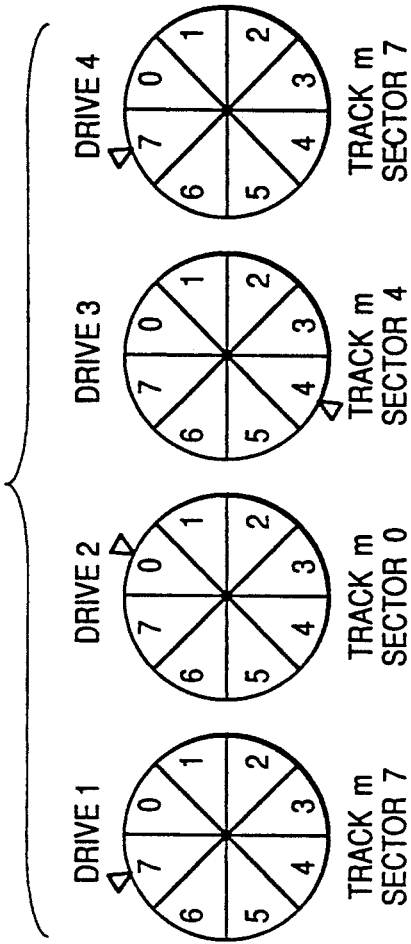
Figure 15A:
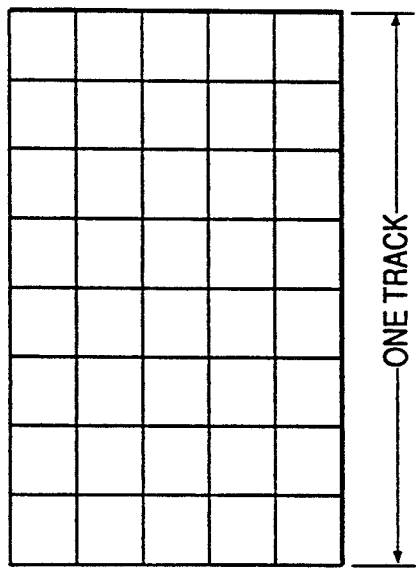

Memory maps for explaining the contents of the buffer memory 15 in continuously reproducing data while executing the synchronizing process of each drive by the control CPU 14 are shown in FIGS. 15(a) and (b) to FIGS. 26(a) and (b).

In FIGS. 15(a) and (b) to FIGS. 26(a) and (b), (a) such figure depicts the contents of the buffer memory 15 and subfigure (b) depicts the position of the optical head of each drive.

At $t_0$, the seek completion signal 42 has been sent from each of the drives 1 to 4.

At time $t_0$, as shown in FIG. 15(b), optical heads of the drives 1, 2, 3 and 4 are respectively positioned at sectors 7, 0, 4 and 7 of a track m to thereby read the data.

As shown in FIG. 15(a), no data in the buffer memory 15 results.

Figure 16B:
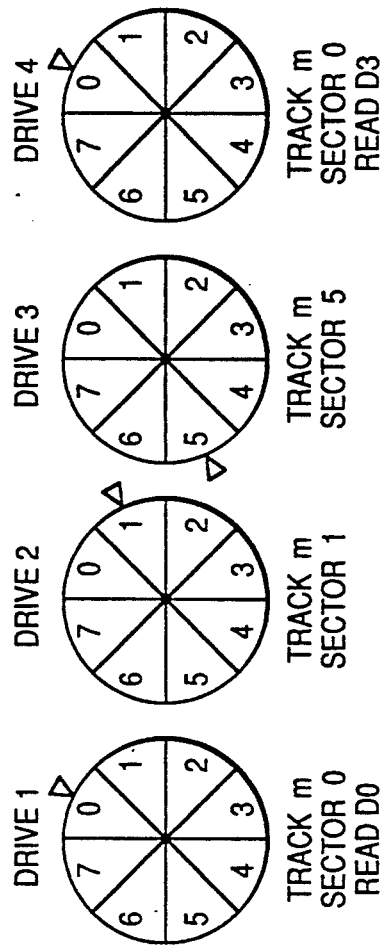

At time $t_1$ as shown in FIG. 16(b), optical heads of the drives 1, 2, 3 and 4 are respectively positioned at sectors 0, 1, 5 and 0 of the track m, and data D0 and D3 are read from the sector 0 of the drives 1 and 4, respectively.

Figure 16A:
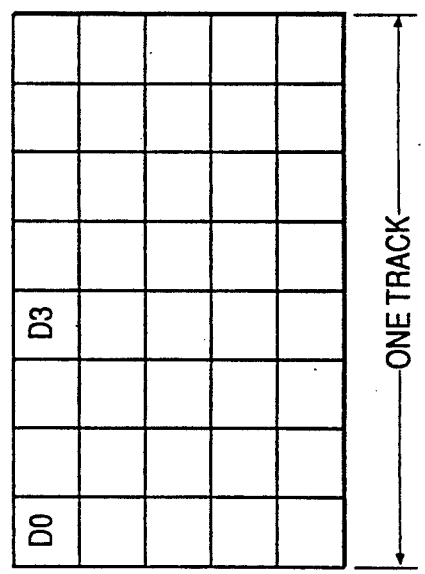

As shown in FIG. 16(a), data D0 and D3 are read by the drives 1 and 4, respectively.

At time $t_2$ (FIGS. 17(a) and (b), optical heads of the drives 1, 2, 3 and 4 are respectively positioned at sectors 1, 2, 6 and 1 of the track m, and data D4 and D7 are read from the sector 1 of the drives 1 and 4, respectively.

As shown in FIG. 17(a), data D4 and D7 are read by the drives 1 and 4, respectively. Also, data D0 and D3 are subjected to the error correction process.

At time $t_3$, as shown in FIG. 18(b), optical heads of the drives 1, 2, 3 and 4 are respectively positioned at sectors 2, 3, 7 and 2 of the track m, and data D8 and D11 are read from the sector 2 of the drives, 1 and 4, respectively.

As shown in FIG. 18(a), data D8 and D11 are read by the drives 1 and 4, respectively. Also, data D4 and D7 are subjected to the error correction process.

At times $t_4$ to $t_7$ (FIGS. 19 (a) and (b) to FIGS. 22(a) and (b), the same processes as those above are carried out.

At time $t_8$, as shown in FIG. 23(b), optical heads of the drives 1, 2, 3 and 4 are respectively positioned at sectors 7, 0, 4 and 7 of the track m, and data D28, D1, D18 and D31 are read from the sectors 7, 0, 4 and 7 of the drives 1, 2, 3 and 4, respectively.

As shown in FIG. 23(a), data D28, D1 D18 and D31 are respectively read by the drives 1, 2, 3 and 4. Also, data D24, D14, and D17 are subjected to the error correction process.

At time $t_9$, as shown in FIG. 24(b), optical heads of the drives 1, 2, 3 and 4 are respectively positioned at the sector 0 of a track (m+1), sectors 1 and 5 of the track m and the sector 0 of the track (m+1), and data D32, D5, D22 and D35 are read by the drives 1, 2, 3 and 4, respectively.

As shown in FIG. 24(a), data D32, D5, D22 and D35 are read by the drives 1, 2, 3 and 4, respectively. Also, data D28, D1, D18 and D31 are subjected to the error correction process.

At time $t_{10}$ as shown in FIG. 25(b), optical heads of the drives 1, 2, 3 and 4 are respectively positioned at the sector 1 of the track (m+1), sectors 2 and 6 of the track m and the sector 1 of the track (m+1), and data D36, D9, D26 and D39 are read by the drives 1, 2, 3 and 4, respectively.

As shown in FIG. 25(a), data D36, D9, D26 and D39 are read by the drives 1, 2, 3 and 4, respectively. Data D0 to D3 are sent through the host interface to the host computer.

At time $t_{11}$ as shown in FIG. 26(b), optical heads of the drives 1, 2, 3 and 4 are respectively positioned at the sector 2 of the track (m+1), sector 3 and 7 of the track m and the sectors 2 of the track (m+1), and data D40, D13, D30 and D43 are read by the drives 1, 2, 3 and 4, respectively.

As shown in FIG. 26(a), data D40, D13, D30 and D43 are read by the drives 1, 2, 3 and 4, respectively. Also, data D36, D9, D26 and D39 are subjected to the error correction process. Data D4 to D7 are sent through the host interface to the host computer.

As explained above, by using a buffer memory with a storage capacity responsible for at least 40 sectors, data, can be continuously reproduced at a transmission speed which is four times as high as that obtained when one unit of an optical disk drive is used.

As shown above, the optical disk recording and/or reproducing apparatus in accordance with the first embodiment of this invention has four drives, and after completion of seeking the target sector by each drive, the recording or reproducing operation is started, so that the deviation in synchronism between the drives can be suppressed below a one track maximum. As a result, the data recording or reproducing operation can be achieved by synchronizing the driver using a small capacity memory. In addition, in this embodiment, the case where the number of drives to be connected is four and the number of sectors per track is eight was exemplified as above, but in general, by using a buffer memory with a capacity responsible for sectors numbering at least more than (the number of drives to be used) x (the number of sectors per drive+two), the recording or reproducing operation of data can be carried out continuously.

Furthermore, in this embodiment, four optical disk drives were used, however, the object of this invention can be attained by using more than two drives. In addition, if the storage capacity of a buffer memory is further increased, it is clear that processes including data transmission from or to the host computer can be realized using a simpler control.

An optical disk recording and/or reproducing apparatus according to a second embodiment of this invention will be described below while referring to the drawings.

Figure 27:
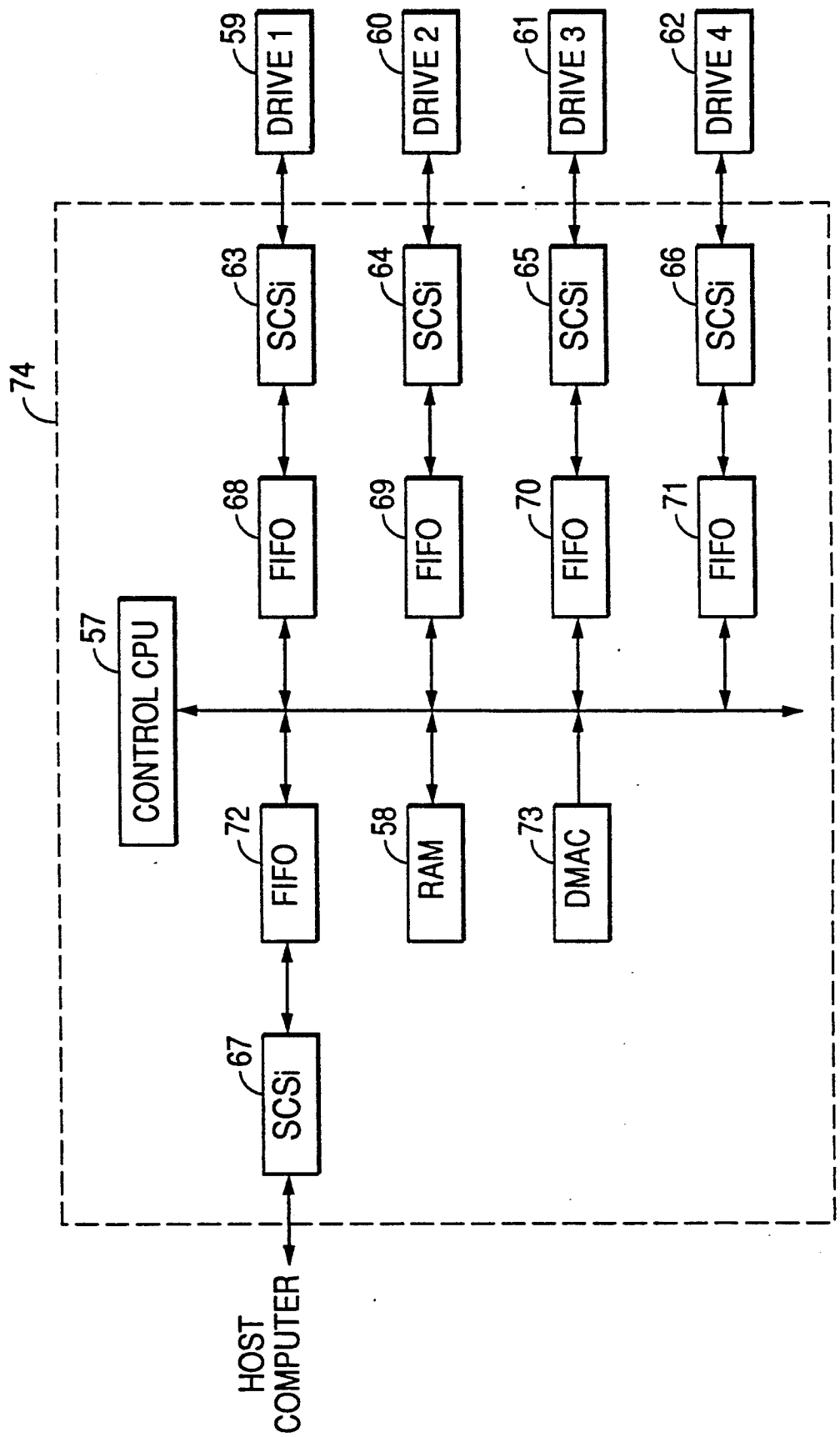
FIG. 27 is a schematic drawing of an optical disk recording and/or reproducing apparatus of a second embodiment of this invention.

FIG. 27 schematically shows the optical disk recording and/or reproducing apparatus of this second embodiment. The reference numeral 57 denotes a control CPU comprising a microprocessor or the like for controlling the entire apparatus, 58 denotes a RAM comprising a semiconductor memory for storing data to be recorded or to be reproduced, 59 to 62 each denotes an optical disk drive for recording or reproducing data on an optical disk having a sector structure, 63 to 66 each a SCSI control circuit for interface-controlling with each denotes of the optical disk drives 59 to 62, 67 denote a SISI control circuit for interface-controlling with the host computer, 68 to 71 each denote a First In First Out (FIFO) memory for temporarily storing transmission data to or from each of the optical disk drives 59 to 62, 72 denotes a FIFO memory for temporarily storing a transmission data to or from the host computer, and 73 denotes a Direct Memory Access Controller (DMAC) for performing DMA transmission of data between the RAM 58 and each of the FIFO memories 69, 69, 70, 71 and 72, which is available in various types in the market as a peripheral LSI of a general-purpose microcomputer.

The optical disk recording and/or reproducing apparatus of the second embodiment of this invention arranged as above includes the optical disk drives 59, 60, 61 and 62 each of which is connected via each of the SCSI (Small Computer Systems Interface) circuits 63, 64, 65 and 66, which are general-purpose interfaces, with a drive control circuit 74 shown by the broken lines in FIG. 27. Furthermore, the drive control circuit 74 also is connected via the SCSI 67 with the host computer.

Figure 28:
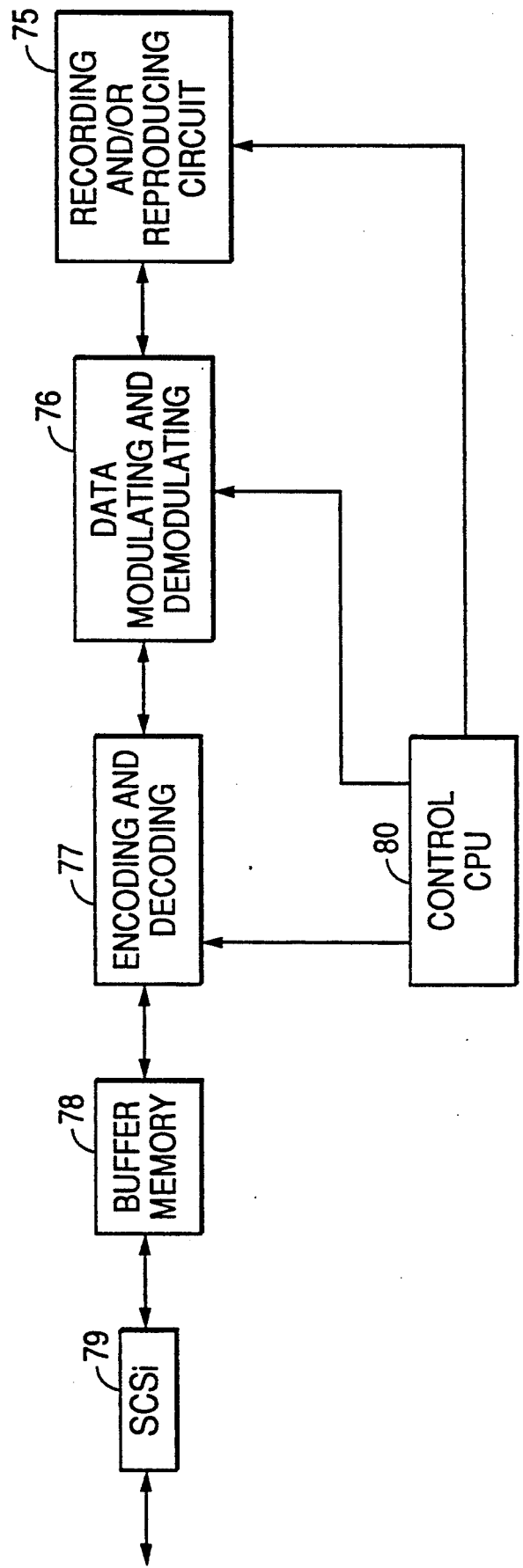
FIG. 28 is a block diagram showing in detail each of optical disk drives 59, 60, 61 and 62 of the apparatus shown in FIG. 27.

FIG. 28 is a block diagram showing in detail each of the optical disk drives 59, 60, 61 and 62, each of which includes a function similar to each of the optical disk drives 28, 29, 30 and 31 shown in the first embodiment. In FIG. 28, recording and/or reproducing circuit 75 for recording or reproducing data is similar in arrangement to that shown in FIG. 2 of the first embodiment. The reference numeral 76 denotes a data modulating and demodulating circuit for digitally modulating an error detection and correction encoded data or for demodulating a reproducing data, 77 denotes does an encoding an decoding circuit for encoding data for the purpose of error detection and correction or for executing the error detection and correction process of demodulated data, 78 a buffer memory for temporarily storing data to be recorded or a data to be reproduced, 79 denotes SCSI circuit for interface-controlling with the drive control circuit 74, and 80 a control CPU for controlling the optical disk drives.

With the optical disk drives 59, 60, 61 and 62 arranged as shown above, when a data is to be recorded, a data sent from the drive control circuit 74 is stored via the SCSI control circuit 79 into the buffer memory 78 then, subjected to the error detection and correction encoding process by the encoding and decoding circuit 77 and sent to the data modulating and demodulating circuit 76 for modulation. When a target sector sent from the control CPU 80 is detected, the recording and/or reproducing circuit 75 focuses a light beam irradiated from a semiconductor laser on a recording plane of an optical disk and records the data in the target sector. On the other hand, when a data is to be reproduced, the recording and/or reproducing circuit 75 reads the data from a target sector sent from the control CPU 80 and sends the data thus read to the data modulating and demodulating circuit 76. The data thus read is demodulated by the data modulating and demodulating circuit 76 then, subjected to the error detection and correction process by the encoding and decoding circuit 77 and sent to the buffer memory 78 to be stored. Next, the data thus stored is sent via the SCSI control circuit 79 to the drive control circuit 74.

As explained above, each of the optical disk drives 59, 60, 61 and 62 can record and/or reproduce a data in the sector unit. Seeking of a target track can be achieved in such a manner that the control CPU 80 sends the address of the target track to the recording and/or reproducing circuit 75 and commands each drive to seek the target track. In addition, executions such as the recording or reproducing, seeking or the like are commanded via the SCSI control circuit 79 from the drive control circuit 74 similar to the case of processing data.

The operation of the optical disk recording and/or reproducing apparatus having four optical disk drives of the second embodiment will be explained below.

When data is to be recorded, the data sent from the host computer is stored via the SCSI control circuit 67 and the FIFO memory 72 into the RAM 58. Also, in this case, the control CPU 57 commands each drive to seek the target track. After all drives have completed seeking the target track, transmission of a data to each drive is started. When all drives complete seeking the target track, the data sent from the host computer are read from the RAM 58 and the data thus read is sent via the FIFO memories 68, 69, 70 and 71 and the SCSI control circuits 63, 64, 65 and 66 respectively to the drives 59, 60, 61 and 62 for recording. Transmission of data between each FIFO memory and the RAM 58 is executed by the DMA transmission through the DMAC 73, that is, by cyclically switching a DMA channel allocated to each FIFO memory. The switching of the DMA channel to the FIFO memory 72 for reading the data sent from the host computer is executed by detecting that there is no data stored in the FIFO memory 72. In the other hand, the switching of the DMA channel to each of the memories 68, 69, 70 and 71 for storing the data to be sent to each drive is executed by detecting that each FIFO memory has data fully stored. The detecting function of the condition, empty or full, of each FIFO memory is generally provided in a general-purpose FIFO memory.

Figure 29:
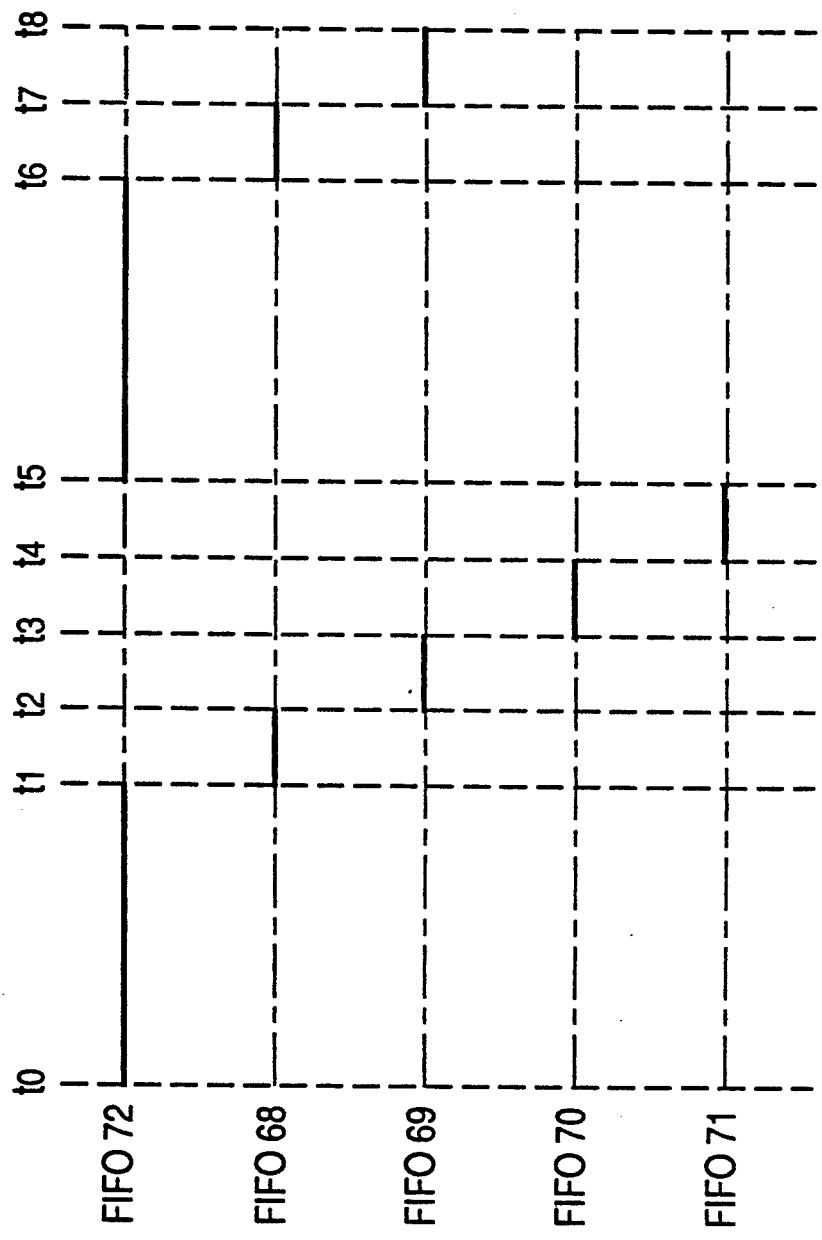
FIG. 29 is a time chart for explaining the switching of the DMA channel 73 of the apparatus shown in FIG. 27.

FIG. 29 is a time chart for explaining the switching of the DMA channel mentioned above. Each continuous line shows the state where the DMA transmission is under way between each FIFO memory and the RAM 58, and the alternate long and short line shows the state that the data transmission is under way between each FIFO memory and each SLSI control circuit.

From time $t_0$ to $t_1$, the FIFO memory 72 for reading a data sent from the host computer DMA-transmits the data thus read to the RAM 58 and the FIFO memories 68, 69, 70 and 71 for storing data to be sent to the drives send the data thus stored via the SCSI control circuits 63, 64, 65 and 66 to the drives 59, 60, 61 and 62, respectively.

From time $t_1$ to $t_2$, the FIFO memory 72 stores via the SCSI control circuit 67 a data sent from the host computer. The FIFO memory 68 receives the data DMA-transmitted from the RAM 58. The FIFO memories 69, 70 and 71 send via the SCSI control circuits 64, 65 and 66 the data being stored thereinto to the drives 60, 61 and 62, respectively.

Similarly, from time $t_2$ to $t_3$, from $t_3$ to $t_4$, from $t_4$ to $t_5$, from $t_5$ to $t_6$, then, the FIFO memory 69, memory 70, memory 71, or memory 72 executes the DMA transmission of a data between each memory and the RAM 58.

Data sent via each SCSI control circuit to each drive is recorded into the target sector in the sector unit.

As explained above, the optical disk recording and/or reproducing apparatus according to the second embodiment can transmit data to a plurality of optical disk drives and record the data rapidly and continuously on a plurality of optical disks while receiving the data from the host computer by successively switching the DMA channel corresponding to each of FIFO memories.

Next, the case where the reproducing operation of data is to be carried out will be explained. Similar to the case of the recording operation, first, the control CPU 57 commands each drive to seek the target track and after all drives has completed seeking the target track, each drive starts to reproduce a data. Data sent from each of the drives 59, 60, 61 and 62 is stored via each of the SCSI control circuits 63, 64, 65 and 66 and each of the FIFO memories 68, 69, 70 and 71 into the RAM 58. The data thus stored into the RAM 58 are readout therefrom and sent via the FIFO memory 72 and the SCSI control circuit 67 to the host computer. The transmission of data between each FIFO memory and the RAM 58 is by means of the DMA transmission process through the DMAC 73 similar to the case of the recording operation, which is executed by successively switching the DMA channel allocated to each FIFO memory. The switching of the DMA channel to each of the FIFO memories 68, 69, 70 and 71 for storing the data thus reproduced from each drive is executed by detecting that there is no data stored in each FIFO memory. On the other hand, the switching of the DMA channel to the FIFO memory 72 for storing the data to be sent to the host computer is executed by detecting that each of the FIFO memories 68, 69, 70 and 71 has the data fully stored. The switching of the DMA channel is successively made similar to the case of the recording operation.

As explained above, the optical disk recording and reproducing apparatus of this second embodiment can send data to the host computer and reproduce the data rapidly and continuously while reading the data from a plurality of optical disk drives by successively switching the DMA channel correspondingly to each FIFO memory.

In general, general-purpose interfaces such as the SCSI or the like transmit data at a frequency of about 4 MHz maximum and on the other hand, a high speed FIFO memory operates at a frequency of about 30 MHz and the RAM 58 made of a semiconductor memory or the like can operate at a high speed in general. In the apparatus of the second embodiment, the data transmission between each interface operable only at a comparatively low speed and the RAM 58 is executed in a DMA transmission manner via a FIFO memory operable at a high speed. When each FIFO memory and the RAM are under the condition operable at the highest speed, that is, when the data is to be stored into the RAM 58 from each FIFO memory, and when there exist the data already stored into each FIFO memory, that is, when the data is to be stored into each FIFO memory from the RAM 58, by switching the DMA channel successively to each FIFO memory under the condition of the same having a free space, the data transmission to the RAM always becomes possible under the highest speed condition. As a result, it is possible to transmit data at a high speed when a plurality of optical disk drives are operated in parallel.

Figures 30, 33:
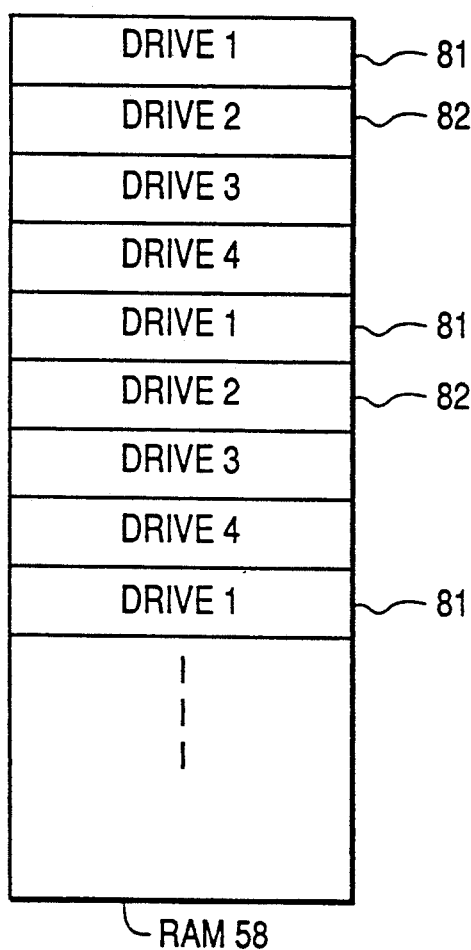
FIG. 30 shows an address map of the RAM 58 shown in FIG. 27.
FIG. 33 shows an address map of each RAM looking from the DMAC 97 and the control CPU 83 shown in FIG. 31.

FIG. 30 is an example of address maps of the RAM 58. In which, the RAM 58 is divided into areas equivalent to one sector, each of which is allocated to each of the drives 1, 2, 3 and 4. For example, each of areas 81 is to be used for the data transmission from or to the drive 1, that is, to be used for the DMA transmission of data between the RAM 58 and the FIFO memory 68. On the other hand, each of areas 82 is to be used for the data transmission from or to the drive 2, that is, to be used for the DMA transmission of data between the RAM 58 and the FIFO memory 69. In addition, these areas all are used for data transmission from or to the host computer, that is, for the DMA transmission of data between the RAM 58 and the FIFO 72.

Allocation of these areas is executed in such a manner that the control CPU 58 sets the top address of each area and the byte count as a target address for DMA transmission to the DMAC 73. Also, the control CPU 57 controls the actuation of DMA transmission of data or the like.

As explained above, the optical disk recording and/or reproducing apparatus of this second embodiment executes the recording or reproducing operation of data in parallel using a plurality of optical disk drives. By successively switching the DMA channel correspondingly to each of the FIFO memories,, the transmission of data between the host computer and each of these optical disk drives can be executed at a high speed, thus being capable of recording and/or reproducing data continuously and rapidly.

In addition, the apparatus of the second embodiment, similar to the apparatus of the first embodiment, makes it possible to reduce the deviation in synchronism between these optical disk drives by starting the recording or reproducing operation of data after each of these optical disk drives have completed seeking the target track, so that the object of this invention can be realized using a RAM 58 having a small storage capacity.

An optical disk recording and/or reproducing apparatus according to a third embodiment of this invention will be described below while referring to the drawings.

Figure 31:
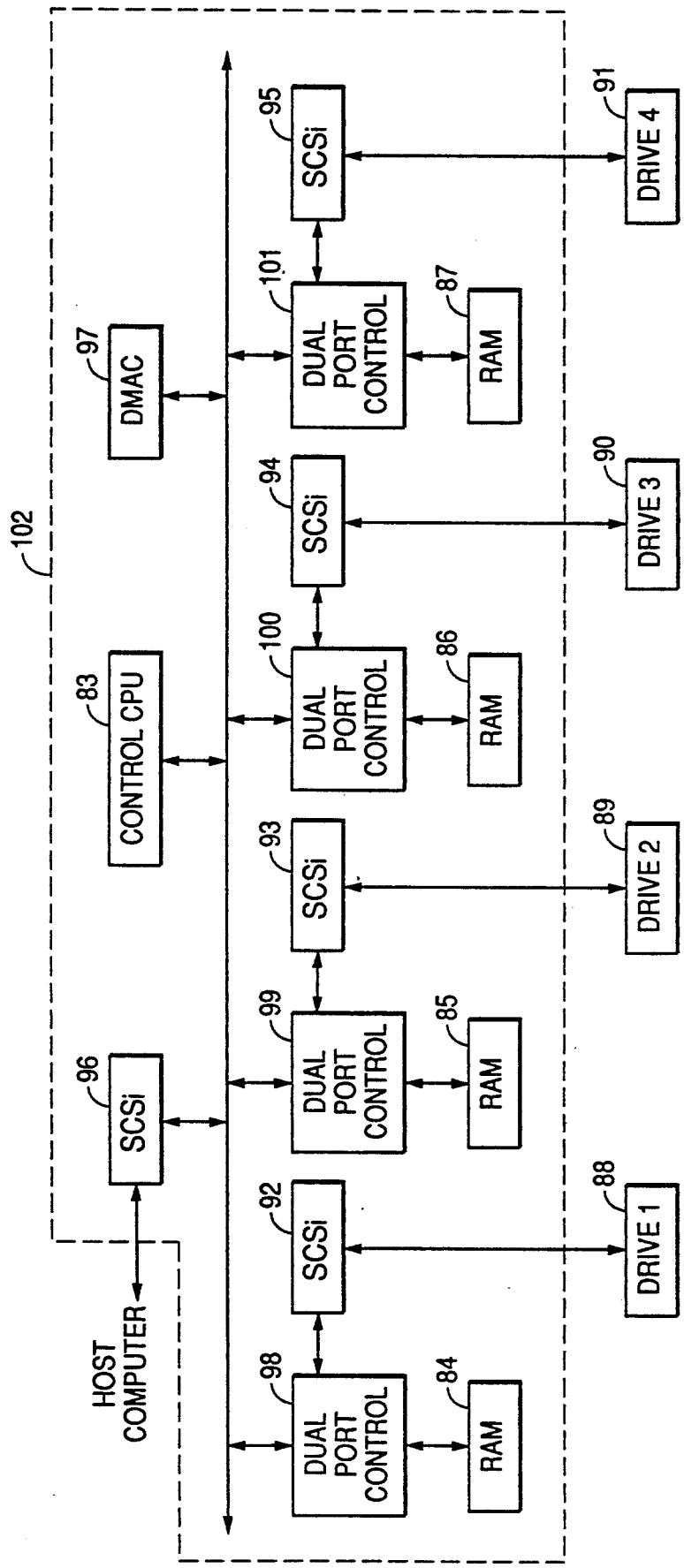
FIG. 31 is a schematic drawing of an optical disk recording and/or reproducing apparatus of a third embodiment of this invention.
Figure 34:
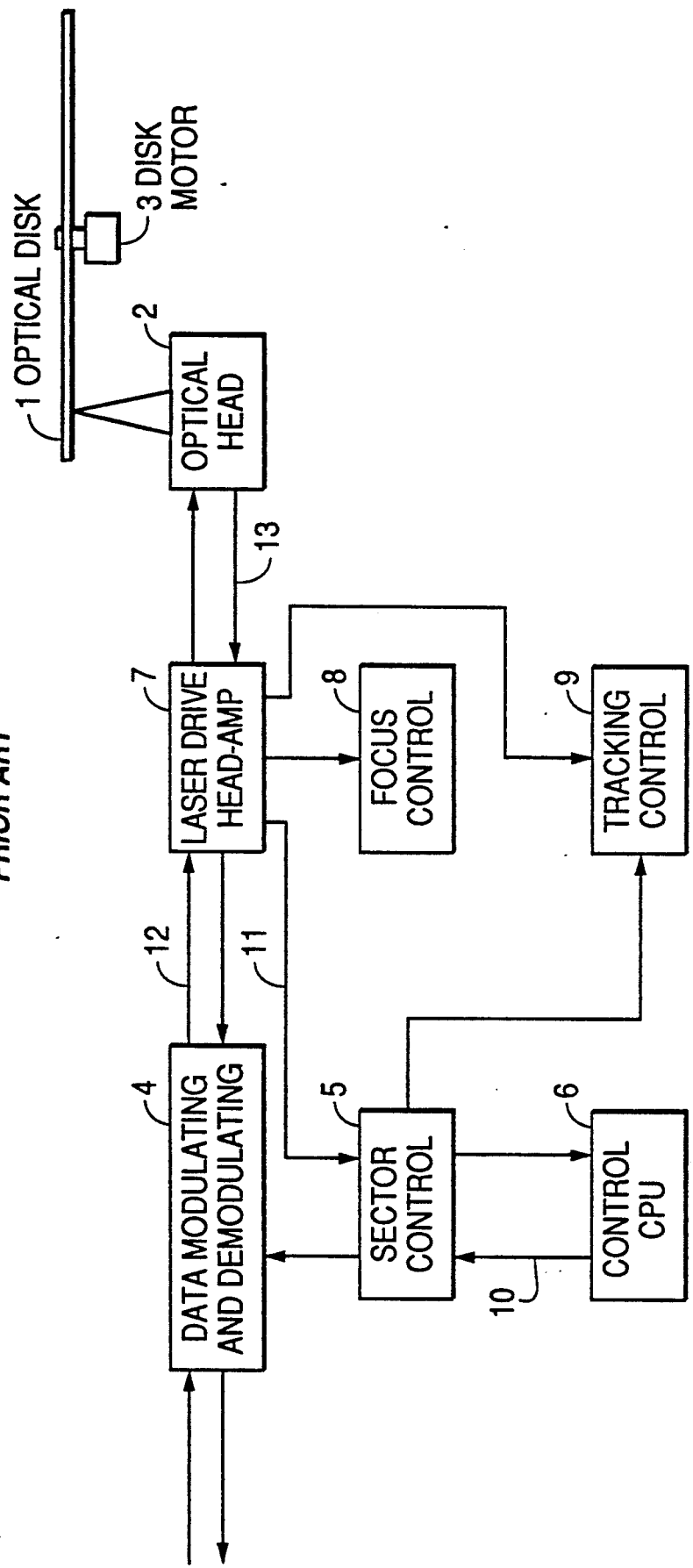
FIG. 34 is a schematic drawing of an optical disk recording and reproducing apparatus according to the prior art.

FIG. 31 schematically shows the optical disk recording and/or reproducing apparatus of this embodiment. Reference numeral 83 denotes a control CPU made of a micro-processor or the like for controlling the entire apparatus, 84 to 87 each denotes a RAM made of a semiconductor memory for storing a data to be recorded or to be reproduced, 88 to 91 each denotes an optical disk drive for recording or reproducing data on an optical disk having a sector structure, 92 to 95 each denotes a SCSI control circuit for interface-controlling with each of the optical disk drives 88, 89, 90 and 91, 96 denotes a SCSI control circuit for interface-controlling with the host computer, and 97 denotes a DMAC for executing the DMA transmission of data between the SCSI control circuit 96 and each of the RAMs 84, 85, 86 and 87, which is available in various types in the market as a peripheral LSI of a general-purpose micro-processor. Also, 98 to 101 each denotes a dual port control circuit comprising a selector or the like for switching the access to each of the RAMs 84, 85, 86 and 87 to two accesses, or access to the SCSI control circuit 96 by the DMAC 97 and access to each of the SCSI control circuits 92, 93, 94 and 95 to be used for transmitting data from or to each of the drives.

With the optical disk recording and/or reproducing apparatus arranged as explained above, a plurality of optical disk drives 88, 89, 90 and 91 are connected respectively via the SCSI control circuits 92, 93, 94 and 95 as a general-purpose interface with a drive control circuit 102 shown by the broken line. The drive control circuit 102 also is connected via the SCSI control circuit 96 with the host computer. In FIG. 31 the optical disk drives 88, 89, 90 and 91 of this third embodiment are respectively identical in structure to the optical disk drives 59, 60, 61 and 62 and capable of seeking a target track as well as recording or reproducing data in the sector unit, the executions of whose performances are commanded through the drive control circuit 102.

The operation of the optical disk recording and/or reproducing apparatus having four optical disk drives of the third embodiment will be explained below.

When data is to be recorded, data sent from the host computer is stored via the SCSI control circuit 96 and each of the dual port control circuits 98, 99, 100 and 101 into each of the RAMs 84, 85, 86 and 87. Data transmission between the SCSI control circuit 96 and each of the RAMs 84, 85, 86 and 87 is executed by the DMAC 97 in a DMA transmission manner, which is performed by decoding the address allocated to each RAM by each dual port control circuit thereby successively switching it therebetween. At this time, in addition, the control CPU 57 commands each optical disk drive to seek the target track and after all drives have completed seeking the target track, transmission of the data to each drive begins. When all drives complete seeking the target track, the data sent from the host computer is readout from each of the RAMs 84, 85, 86 and 87 and sent via each of the dual port control circuits 98, 99, 100 and 101 and each of the SCSI control circuits 92, 93, 94, and 95 to each of the drives 88, 89,90 and 91 for recording.

FIG. 32 is a time chart for explaining the switching of the access to each RAM. The state where data sent from the host computer is DMA-transmitted between the SCSI control circuit 97 and each RAM is shown by the continuous line, and the state where the data is transmitted via each of the SCSI control circuits 92, 93, 94 and 95 between each drive and the RAM corresponding thereto is shown by the broken line.

From time $t_0$ to $t_1$, the data from the host computer is DMA transmitted via the SCSI control circuit 96 to the RAM 84. On the other hand, the data already stored in the RAMs 85, 86, and 87 are sent via the SCSI control circuits 93, 94 and 95 to the drives 89, 90 and 91 respectively.

From time $t_1$ to $t_2$, the data from the host computer is DMA-transmitted via the SCSI control circuit 96 to the RAM 85. On the other hand, the data already stored in the RAMs 84, 86 and 87 are sent via the SCSI control circuits 92, 94 and 95 to the drives 88, 90 and 91, respectively. Similarly, from $t_2$ to $t_3$, the DMA-transmission of a data is carried out between the RAM 86 and the SCSI control circuit 96, and from $t_3$ to $t_4$, the DMA-transmission of data is carried out between the RAM 87 and the circuit 96, and at the same time, other RAMs 84, 85 and 87 send the data to the drives 86, 89 and 71, respectively.

Data sent via the SCSI control circuits 92, 93, 94 and 95 respectively to the drives 88, 89, 90 and 91 are recorded in their target sectors in the sector unit.

As explained above, in the optical disk recording and/or reproducing apparatus according to the third embodiment, data sent from the host computer is always DMA-transmitted to one of the RAMs and at the same time, the other RAMs send data to their corresponding drives, so that this apparatus makes it possible, while receiving data from the host computer, to send the data thus recieved to a plurality of optical disk drives thereby recording the data on the optical disks continuously and rapidly.

Next, the reproducing operation of data will be explained. When data is to be reproduced, similar to the case of the recording operation, first, the control CPU 83 commands each drive seeking the target truck and after all drives have completed to seek the target track, each drive starts to reproduce the data. Data sent from each drive is stored via each of the SCSI control circuits 92, 93, 94 and 95 into each of the RAMs 84, 85, 86 and 87. The data thus stored is readout by each RAM and sent via the SCSI control circuit 96 to the host computer in a DMA transmission manner. Data transmission between each RAM and each SCSI control circuit is, similar to the case of the recording operation, performed by decoding the address allocated to each RAM by each of the dual port control circuits 98, 99, 100 and 101 thereby successively switching it therebetween.

As explained above, in the optical disk recording and/or reproducing apparatus of the third embodiment, one of the RAMs always DMA-transmits reproduced data to the host computer and at the same time, to the other RAMs is sent a data from their corresponding drives, so that this apparatus makes it possible, while reading data from a plurality of optical disk drives, to send the data thus read to the host computer, thereby reproducing the data continuously and rapidly.

FIG. 33 is an example of address maps of the RAM 84, 85, 86 and 87 viewed from the DMAC 97 and the control CPU 83. Each RAM is divided into areas equivalent to one sector, and the upper address is divided by 4 and then, allocation is made in such a manner that the area that the residual is 0 is the RAM84, the area that it is 1 is the RAM85, the area that it is 2 is the RAM86 and the area that it is 3 is the RAM 87. When the address of each RAM is allocated as above, each dual port control circuit can execute the switching between the access from the DMAC 97 and the access from each of the SCSI control circuits 92, 93, 94 and 95 by decoding two lower bits of the upper address. That is,, the upper address from the DMAC 97 is decoded and each dual port control circuit coincided therewith switches the access to the corresponding RAM to the access from the DMAC97, and each dual port control circuit not coincided therewith switches it to the access from each SCSI control circuit. Such switching function can be easily realized by arranging the selector as mentioned above.

As explained above, in the optical disk recording and/or reproducing apparatus of the third embodiment, when a plurality of optical disk drives are operated in parallel, DMA transmission of data is executed between the SCSI control circuit 97 and one of the RAMs by switching the access direction to said one of the RAMs through the corresponding one of a plurality of dual port control circuits and at the same time, the other RAMs than said one have the data transmission with the corresponding optical disk drives. As a result, the data transmission from or to a plurality of optical disk drives and that from or to the host computer can be simultaneously executed, which means that the data transmission between the host computer and each of these optical disk drives can be performed at a high speed, largely contributing to obtaining a continuous, rapid recording or reproducing operation of data.

In addition, in the apparatus of the third embodiment, similar to that of the first embodiment, a plurality of optical disk drives start the recording or reproducing operation of data after completion of seeking the target track to thereby reduce the deviation of synchronism between the drives, thus being capable of practically realizing the object of this invention by using the RAMs 84, 85, 86 and 87 with a small capacity.

As described above, an optical disk recording and/or reproducing apparatus in accordance with this invention has a plurality of optical disk drives and these drives are operated in parallel to execute the recording or reproducing operation of a data, so that a high transmissibility of data can be realized, leading to substantial practical advantages.

What is claimed is:

1. An optical disk recording and reproducing apparatus for recording data onto and reproducing data from a plurality of optical disks each having formed thereon a plurality of tracks each divided into a plurality of sectors, said apparatus comprising:
    (a) a plurality of optical disk drives each comprising,
        encoding and decoding means for encoding a data to be recorded to obtain an encoded data and for decoding a reproduced encoded data to obtain a reproduced data, modulating and demodulating means for modulating the encoded data from said encoding and decoding means to obtain a modulated data and for demodulating a reproduced modulated data to obtain the reproduced encoded data inputted to said encoding and decoding means, seeking means for seeking a target track among the plurality of tracks on a corresponding one optical disk of the plurality of optical disks and for producing a seeking completion signal indicative of a completion of seeking the target track, recording and reproducing means for recording the modulated data from said modulating and demodulating means onto said target track and for reproducing the recorded data from said target track to obtain the modulated data inputted to said modulating and demodulating means; and (b) buffer memory means coupled to each of said plurality of optical disk drives for temporarily storing therein the data to be recorded sent from a host system to each of said plurality of optical disk drives and the reproduced data sent from each of said plurality of optical disk drives to the host system; and (c) control means for controlling said plurality of optical disk drives, said control means being responsive to said seeking completion signal sent from said seeking means of each of said plurality of optical disk drives for confirming that all of said plurality of optical disk drives have completed seeking of a respective target track and for, upon such a confirmation, activating said plurality of optical disk drives to start respective data recording or reproducing operations in parallel, thereby synchronizing the data recording or reproducing operations of said plurality of optical disk drives with one another.

2. An optical disk recording and reproducing apparatus in which a plurality of optical disk drives are connected to drive control means through a plurality of drive interfaces, respectively, for recording data onto and reproducing data from a plurality of optical disks each having formed thereon a plurality of tracks each divided into a plurality of sectors, said apparatus comprising:

(a) said plurality of optical disk drives each comprising, a first buffer memory for temporarily storing a data to be recorded sent from a corresponding one of said plurality of drive interfaces and a reproduced data to be sent to the corresponding one of said plurality of drive interfaces, data encoding and decoding means for encoding the data to be recorded from said first buffer memory to obtain an encoded data and for decoding a reproduced encoded data to obtain the reproduced data sent to said first buffer memory, modulating and demodulating means for modulating the encoded data from said encoding and decoding means to obtain a modulated data and for demodulating a reproduced modulated data to obtain the reproduced encoded data inputted to said encoding and decoding means, seeking means for seeking a target track among the plurality of tracks on a corresponding optical disk of the plurality of optical disks and for producing a seeking completion signal indicative of a completion of seeking the target track, recording and reproducing means for recording the modulated data from said modulating and demodulating means onto said target track and for reproducing the recorded data from said target track to obtain the modulated data inputted to said modulating and demodulating means, and a first drive interface control means for controlling data transmission to and from said drive control means through the corresponding one of said plurality of drive interfaces, (b) said drive control means comprising:

a plurality of second drive interface control means each for controlling data transmission to and from said first drive interface control means of a corresponding one of said plurality of optical disk drives through a corresponding one of said plurality of drive interfaces, host interface control means for controlling data transmission to and from a host system, a plurality of FIFO memories connected to said plurality of drive interfaces, respectively, for temporarily storing data to be sent to and from said plurality of optical disk drives, a FIFO memory connected to said host interface control means for temporarily storing data to be sent to and from said host system, a second buffer memory connected to said plurality of FIFO memories and said FIFO memory for temporarily storing data to be transmitted between said FIFO memory and each of said plurality of FIFO memories, and DMA control means having direct memory access channels corressponding to said plurality of FIFO memories and said FIFO memory for executing direct memory access data transmission between said second buffer memory and each of said plurality of FIFO memories and said FIFO memory, and (c) control means for controlling said plurality of optical disk drives and said drive control means, said control means being responsive to said seeking completion signal sent from said seeking means of each of said plurality of optical disk drives for confirming that all of said plurality of optical disk drives have completed seeking of the respective target tracks and for, upon such confirmation, activating said plurality of optical disk drives to start respective data recording or reproducing operations in parallel and activating said DMA control means for cyclically switching the direct memory access channels, thereby synchronizing the data recording or reproducing operations of said plurality of optical disk drives with one another.

3. An optical disk recording and reproducing apparatus in which a plurality of optical disk drives are connected to drive control means through a plurality of drive interfaces, for recording data onto and reproducing data from a plurality of optical disk each having formed thereon a plurality of tracks each divided into a plurality of sectors, respectively, said apparatus comprising:

(a) said plurality of optical disk drives each comprising, a first buffer memory for temporarily storing a data to be recorded sent from a corresponding one of said plurality of drive interfaces and a reproduced data to be sent to the corresponding one of said plurality of drive interfaces, data encoding or decoding means for encoding the data to be recorded from said first buffer memory to obtain an encoded data and for decoding an encoded data inputted thereto to obtain the reproduced data sent to said first buffer memory, modulating and demodulating means for modulating the encoded data from said encoding and decoding means to obtain a modulated data and for demodulating a reproduced modulated data to obtain the reproduced encoded data inputted to said encoding and decoding means, seeking means for seeking a target track among the plurality of tracks on a corresponding optical disk of the plurality of optical disks and for producing a seeking completion signal indicative of a completion of seeking the target track, recording and reproducing means for recording the modulated data from said modulating and demodulating means onto said target track and for reproducing the recorded data from said target track to obtain the modulated data inputted to said modulating and demodulating means, and a first drive interface control means for controlling data transmission to and from said drive control means through the corresponding one of said plurality of drive interfaces, (b) said drive control means comprising, a plurality of second drive interface control means each for controlling data transmission to and from said first drive interface control means of a corresponding one of said plurality of optical disk drives through a corresponding one of said plurality of drive interfaces, a plurality of buffer memories for temporarily storing data to be sent to and from said plurality of drive interfaces, respectively, host interface control means for controlling data transmission to and from a host system;

DMA control means for executing direct memory access data transmission between said host interface control means and each of said plurality of buffer memories, and a plurality of dual port control means for switching an access to said plurality of buffer memories from said DMA control means and an access to each of said plurality of buffer memories from a corresponding one of said plurality of second drive interface control means, and (c) control means for controlling said plurality of optical disk drives and said disk drive control means, said control means being responsive to said seeking completion signal sent from said seeking means of each of said plurality of optical disk drives for confirming that all of said plurality of optical disk drives have completed seeking of the respective target tracks and for, upon such a confirmation, activating said plurality of dual port control means to execute data transmission between each of the remaining plurality of drive interfaces, thereby synchronizing the data recording or reproducing operations of said plurality of optical disk drives with one another.

4. A disk recording and reproducing apparatus for recording data onto and reproducing from a plurality of recording disks each having formed thereon a plurality of tracks each divided into a plurality of sectors, said apparatus comprising:

(a) a plurality of optical disk drives each comprising,
encoding and decoding means for encoding a data to be recorded to obtain an encoded data and for decoding a reproduced encoded data to obtain a reproduced data;

modulating and demodulating means for modulating the encoded data from said encoding and decoding means to obtain a modulated data and for demodulating a reproduced modulated data to obtain the reproduced encoded data inputted to said encoding and decoding means;

seeking means for seeking a target track among the plurality of tracks on a corresponding one recording disk of the plurality of recording disks and for producing a seeking completion signal indicative of a completion of seeking the target track;

recording and reproducing means for recording the modulated data from said modulating and demodulating means onto said target track and for reproducing the recorded data from said target track to obtain the modulated data inputted to said modulating and demodulating means, and (b) buffer memory means coupled to each of said plurality of disk drives for temporarily storing therein the data to be recorded sent from a host system to each of said plurality of disk drives and the reproduced data sent from each of said plurality of disk drives to the host system; and (c) control means for controlling said plurality of disk drives, said control means being responsive to said seeking completion signal sent from said seeking means of each of said plurality of disk drives for confirming that all of said plurality of disk drives have completed seeking of the respective target tracks and for, upon such a confirmation, activating a plurality of disk drives to start responsive data recording or reproducing operations in parallel, thereby synchronizing the data recording or reproducing operations of said plurality of disk drives with one another.

* * * * *